United States Patent
Wifvesson et al.

(10) Patent No.: US 10,897,707 B2
(45) Date of Patent: *Jan. 19, 2021

(54) METHODS AND APPARATUS FOR DIRECT COMMUNICATION KEY ESTABLISHMENT

(71) Applicant: Telefonaktiebolaget LM Ericsson (publ), Stockholm (SE)

(72) Inventors: Monica Wifvesson, Lund (SE); Vesa Lehtovirta, Jorvas (FI); Katharina Pfeffer, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 547 days.

This patent is subject to a terminal disclaimer.

(21) Appl. No.: 15/544,481

(22) PCT Filed: Nov. 18, 2015

(86) PCT No.: PCT/EP2015/076952
§ 371 (c)(1),
(2) Date: Jul. 18, 2017

(87) PCT Pub. No.: WO2016/116192
PCT Pub. Date: Jul. 28, 2016

(65) Prior Publication Data
US 2018/0270653 A1    Sep. 20, 2018

Related U.S. Application Data

(60) Provisional application No. 62/104,960, filed on Jan. 19, 2015.

(51) Int. Cl.
*H04L 9/00* (2006.01)
*G06F 21/00* (2013.01)
(Continued)

(52) U.S. Cl.
CPC .......... *H04W 12/04* (2013.01); *H04L 9/0866* (2013.01); *H04L 9/3242* (2013.01);
(Continued)

(58) Field of Classification Search
None
See application file for complete search history.

(56) References Cited

U.S. PATENT DOCUMENTS

| 2008/0095361 | A1 | 4/2008 | Wifvesson et al. | |
|---|---|---|---|---|
| 2009/0204806 | A1* | 8/2009 | Kanemura | G06F 21/10 713/155 |
| 2017/0055152 | A1* | 2/2017 | Zhang | H04W 76/14 |

FOREIGN PATENT DOCUMENTS

WO    WO-2013159818 A1 * 10/2013

OTHER PUBLICATIONS

International Search Report and Written Opinion issued in International Application No. PCT/EP2015/076952, dated Feb. 25, 2016, 13 pages.

(Continued)

*Primary Examiner* — Alexander Lagor
(74) *Attorney, Agent, or Firm* — Patent Portfolio Builders, PLLC

(57) ABSTRACT

Methods And Apparatus For Direct Communication Key Establishment Methods, apparatuses and system are disclosed for establishing a key for secure direct communication between a User Equipment device, UE, and a device. The system comprises a UE (20), a device (30) and a Direct Communication Element (40). The UE establishes a UE shared key with a Bootstrapping Server Function, BSF (50), using a Generic Bootstrapping Architecture, GBA, procedure. The device receives a transaction identifier associated with the UE shared key from the UE, and sends the transaction identifier to the Direct Communication Element. The Direct Communication Element receives the transaction (Continued)

identifier from the device, obtains a shared session key from the BSF, derives the UE delivery key, generates the direct communication key, encrypts the direct communication key with the UE delivery key, and sends the direct communication key and the encrypted direct communication key to the device. The device then forwards the encrypted direct communication key to the UE. UE derives the shared session, the UE delivery key and decrypts the direct communication key.

36 Claims, 17 Drawing Sheets

(51) Int. Cl.
| | |
|---|---|
| *H04W 12/04* | (2009.01) |
| *H04L 29/06* | (2006.01) |
| *H04L 9/08* | (2006.01) |
| *H04L 9/32* | (2006.01) |
| *H04W 48/16* | (2009.01) |
| *H04W 76/14* | (2018.01) |

(52) U.S. Cl.
CPC ..... *H04L 63/061* (2013.01); *H04W 12/04031* (2019.01); *H04W 48/16* (2013.01); *H04L 2209/80* (2013.01); *H04W 76/14* (2018.02)

(56) References Cited

OTHER PUBLICATIONS

3GPP TS 33.259 V10.0.0 Release 10, 3rd Generation Partnership Project; Technical Specification Group Services and System Aspects; Key establishment between a UICC Hosting Device and a Remote Device, Mar. 2011, 28 pages.
ETSI TS 133 303 V12.2.0, Universal Mobile Telecommunications System (UMTS); LTE; Proximity-based Services (ProSe); Security aspects (3GPP TS 33.303 version 12.2.0 Release 12), Jan. 2015, 67 pages.
3GPP TS 33.220 V12.3.0 Release 12, 3rd Generation Partnership Project; Technical Specification Group Services and System Aspects; Generic Authentication Architecture (GAA); Generic Bootstrapping Architecture (GBA), Jun. 2014, 92 pages.
3GPP TS 33.259 V12.0.0 Release 12, 3rd Generation Partnership Project; Technical Specification Group Services and System Aspects; Key establishment between a UICC Hosting Device and a Remote Device, Sep. 2014, 28 pages.
3GPP TS 23.303 V12.3.0 Release 12, 3rd Generation Partnership Project; Technical Specification Group Services and System Aspects; Proximity-based services (ProSe); Stage 2, Dec. 2014, 62 pages.
Office Action issued in corresponding EP Application No. 15798021.0; dated Nov. 20, 2018; 04 Pages.

\* cited by examiner

METHODS AND APPARATUS FOR DIRECT COMMUNICATION KEY ESTABLISHMENT

CROSS REFERENCE TO RELATED APPLICATION(S)

This application is a 35 U.S.C. § 371 National Stage of International Patent Application No. PCT/EP2015/076952, filed Nov. 18, 2015, designating the United States and claiming priority to U.S. provisional application No. 62/104,960, filed on Jan. 19, 2015. The above identified applications are incorporated by reference.

TECHNICAL FIELD

The present invention relates to methods for establishing a key for direct communication between a User Equipment device, UE, and a device. The present invention also relates to a UE, a device and a Direct Communication Element, and to a computer program configured to carry out methods for establishing a key for direct communication between a UE and a device.

BACKGROUND

Direct communication involves establishing a radio connection between two devices without transiting via an access network of a cellular communication network. Direct communication may be used to establish communication between two User Equipment Devices (UEs) which may or may not be out of network coverage, or may enable one device to act as a relay for another device, providing access to network services to a device which is out of network coverage. In the $3^{rd}$ Generation Partnership Project (3GPP), direct communication is enabled via Proximity Services (ProSe), as set out in TS 33.303 and other standard documents. The following discussion focuses on 3GPP ProSe but is equally applicable to other direct communication technologies.

ProSe consists of two main elements: ProSe Direct Discovery, involving the network assisted discovery of users with a desire to communicate who are in close physical proximity, and ProSe Direct Communication, in which direct communication between such users is facilitated with or without supervision from the network. The ProSe direct communication path may use Evolved UMTS Terrestrial Radio Access (E-UTRA) or Wireless Local Area Network direct (WLAN direct) radio technology.

FIG. 1 illustrates a reference ProSe architecture, according to which two ProSe-enabled UEs 2 may establish a direct communication path between them. Communication between the devices takes place over the PC5 interface, with each device able to communicate with a ProSe Function 4 in the cellular network over the PC3 interface, and with a ProSe application server 6 over a PC1 interface. ProSe direct communication may also involve a ProSe "UE-to-Network Relay", according to which a device, which may itself be a UE, may act as a relay between the E-UTRAN and a UE which is out of the coverage area of the E-UTRAN. This arrangement is illustrated in FIG. 2, with remote UE 2 obtaining access to the E-UTRAN via ProSe direct communication with a ProSe UE-to-Network Relay 8. ProSe direct communication is particularly advantageous for public safety communication, providing communication services for the emergency services and other public safety bodies. The example of FIG. 2 illustrates the ProSe enabled remote UE 2 communicating with a Public Safety Application Server 10 via the E-UTRAN and EPC, which the remote UE 2 can access via ProSe direct communication with the ProSe UE-to-Network Relay 8.

In order to secure communication between two devices using ProSe Direct Communication, a shared key may be used when communicating over the PC5 interface. Standard procedure is to pre-configure appropriate shared keys into ProSe enabled devices. However, pre-configuring appropriate shared keys to enable ProSe Direct Communication with every other device that an enabled device may wish to communicate with may be extremely challenging. A single ProSe enabled UE may wish to communicate with a range of different ProSe enabled UEs, and with many different UE-to-Network Relays serving different cells within the network. In addition, two ProSe enabled UEs, or a UE and UE-to-Network Relay, wishing to communicate may be served by different Home PLMNs, or one or both devices may roam into a new PLMN, further complicating the task of pre-configuring shared keys. Pre-configuring shared keys in all of the relevant ProSe enabled devices to enable all of the possible communication paths that may be desired is therefore an extremely complex process.

SUMMARY

It is an aim of the present invention to provide methods, apparatus and computer readable media which at least partially address one or more of the challenges discussed above.

According to a first aspect of the present invention, there is provided a method, performed by a User Equipment device, UE, for obtaining a key for direct communication with a device over an interface. The method comprises establishing a UE shared key with a Bootstrapping Server Function, BSF, using a Generic Bootstrapping Architecture, GBA, procedure, and receiving from the BSF a transaction identifier associated with the UE shared key. The method further comprises sending the transaction identifier and a Direct Communication Element identifier to the device, requesting the device to obtain the direct communication key, and receiving from the device the direct communication key encrypted with a UE delivery key. The method further comprises deriving a session shared key from at least the UE shared key and the Direct Communication Element identifier and deriving the UE delivery key from at least the session shared key and an identifier of the device. The method further comprises decrypting the direct communication key using the derived UE delivery key.

According to examples of the invention, the steps of the above method may be performed in a different order. For example, the transaction identifier and the Direct Communication Element identifier may be sent to the device after deriving the session shared key and UE delivery key.

According to examples of the invention, the device may be a UE, a UE-to-Network Relay, or may be a network node.

According to examples of the invention, the UE delivery key may be derived using additional inputs to the session shared key and the device identifier, including for example, the UE identifier or other suitable identifiers. In some examples, the UE delivery key may be derived using a Key Derivation Function (KDF), and the input parameters may be hashed or otherwise processed before they are used to derive the direct communication key. The KDF can be any standard function such as the KDF defined in 3GPP TS 33.220.

According to examples of the invention, the interface may comprise a Proximity Services, ProSe, interface, and the Direct Communication Element may comprise at least one of a ProSe Function or a ProSe Key Management Server (KMS). The ProSe interface may comprise a PC5 interface.

According to examples of the invention, the UE may also receive a direct communication key identifier and the device identity with the encrypted direct communication key.

According to examples of the invention, the method may further comprise discovering the device through a discovery procedure. The discovery procedure may comprise ProSe Direct Discovery according to Model A or Model B and may be initiated by the UE or the device. According to examples of the invention, at least one of the transaction identifier, the Direct Communication Element identifier or the request to obtain the direct communication key may be comprised within a discovery procedure message.

According to examples of the invention, the method may further comprise receiving a discovery message from the device, wherein the discovery message includes the identifier of the device. The discovery message may be a Direct Discovery broadcast according to ProSe Model A or may be a Direct Discovery request message according to ProSe Model B.

According to examples of the invention, the discovery message may further include the Direct Communication Element identifier.

According to examples of the invention, sending the transaction identifier and the Direct Communication Element identifier to the device and requesting the device to obtain the direct communication key may comprise sending a discovery response message responding to the received discovery message.

According to examples of the invention, the method may further comprise receiving a Message Authentication Code, MAC, with the direct communication key encrypted with the UE delivery key, wherein the MAC is generated using the direct communication key, checking the MAC using the decrypted direct communication key, and if the check is successful, sending a confirmation message to the device.

According to examples of the invention, the method may further comprise sending a MAC with the confirmation message, wherein the MAC is generated using the decrypted direct communication key.

According to examples of the invention, if the device comprises a UE-to-Network relay, the method may further comprise conducting the step of establishing a UE shared key with a BSF using a GBA procedure, and receiving from the BSF a transaction identifier associated with the UE shared key, before exiting a coverage area of the communication network with which the UE is communicating.

According to examples of the invention, if the UE is comprised within a first communication network and the device is comprised within a second communication network, the Direct Communication Element may comprise a first sub-Element in the first communication network and a second sub-Element in the second communication network. The first sub-Element may in some examples be a ProSe Function or ProSe KMS in a home PLMN of the UE and the second sub-Element may be a ProSe Function or ProSe KMS in a home PLMN of the device. In some examples, the BSF may be comprised in the first communication network. For the purposes of the present specification, a UE device which is comprised within a communication network may for example comprise a UE or device which subscribes to the communication network.

According to another aspect of the present invention, there is provided a method, performed by a device, for obtaining a key for direct communication with a User Equipment device, UE, over an interface. The method comprises receiving from the UE a transaction identifier, a Direct Communication Element identifier and a request to obtain a direct communication key. The method further comprises sending to the Direct Communication Element identified by the Direct Communication Element identifier the transaction identifier and an identifier of the device, and requesting the Direct Communication Element to provide the device with the direct communication key. The method further comprises receiving the direct communication key and the direct communication key encrypted with a UE delivery key from the Direct Communication Element and sending the encrypted direct communication key to the UE.

According to examples of the invention, the device may be a UE, a UE-to-Network Relay or may be a network node.

According to examples of the invention, the Direct Communication Element may be a functional element hosted on a server or other processing element.

According to examples of the invention, the interface may comprise a Proximity Services, ProSe, interface, and the Direct Communication Element may comprise at least one of a ProSe Function or a ProSe KMS.

According to examples of the invention, device may also receive a direct communication key identifier and may send this to the UE with the encrypted direct communication key. The device may also send its identifier with the encrypted direct communication key.

According to examples of the invention, the method may further comprise discovering the UE through a discovery procedure, which may fir example be a ProSe Direct Discovery procedure according to Model A or Model B. According to examples of the invention, at least one of the transaction identifier, the Direct Communication Element identifier or the request to obtain the direct communication key may be comprised within a discovery procedure message.

According to examples of the invention, the method may further comprise sending a discovery message to the UE, wherein the discovery message includes the identifier of the device. According to some examples, the discovery message may be a Direct Discovery broadcast according to ProSe Model A or a Direct Discovery request message according to ProSe Model B.

According to examples of the invention, the discovery message may further include the Direct Communication Element identifier.

According to examples of the invention, receiving from the UE a transaction identifier, a Direct Communication Element identifier and a request to obtain a direct communication key may comprise receiving a discovery response message responding to the sent discovery message.

According to examples of the invention, the method may further comprise generating a Message Authentication Code, MAC, using the direct communication key received from the Direct Communication Element, and sending the MAC with the encrypted direct communication key to the UE.

According to examples of the invention, the method may further comprise receiving a confirmation message from the UE indicating that the UE has decrypted the direct communication key.

According to examples of the invention, if the UE is comprised within a first communication network and the device is comprised within a second communication network, the Direct Communication Element may comprise a first sub-Element in the first communication network and a second sub-Element in the second communication network. In some examples, the first sub-Element may be a ProSe Function or ProSe KMS in a home PLMN of the UE and the second sub-Element may be a ProSe Function or ProSe KMS in a home PLMN of the device.

According to examples of the invention, if the UE is comprised within a first communication network and the device is comprised within a second communication network, sending to and receiving from the Direct Communication Element may comprise sending to and receiving from the second sub-Element comprised within the second communication network.

According to another aspect of the present invention, there is provided a method, performed by a Direct Communication Element, for establishing a key for direct communication over an interface between a User Equipment device, UE, and a device. The method comprises receiving from the device a transaction identifier, a device identifier and a request to provide a direct communication key to the device, sending the transaction identifier to a Bootstrapping Server Function, BSF, corresponding to the transaction identifier, and receiving a session shared key from the BSF. The method further comprises deriving a UE delivery key from the session shared key and at least the device identifier, generating a direct communication key for direct communication between the UE and the device, encrypting the direct communication key with the UE delivery key, and sending the direct communication key and the encrypted direct communication key to the device.

According to examples of the invention, the device may be a UE, a UE-to-Network Relay, or may be a network node.

According to examples of the invention, the UE delivery key may be derived using additional inputs to the session shared key and the device identifier, including for example, the UE identifier or other suitable identifiers. In some examples, the UE delivery key may be derived using a Key Derivation Function (KDF), and the input parameters may be hashed or otherwise processed before they are used to derive the direct communication key. The KDF may be any standard function such as the KDF defined in 3GPP TS 33.220.

According to examples of the invention, the direct communication key may be generated using a random number generator.

According to examples of the invention, the interface may comprise a Proximity Services, ProSe, interface, and the Direct Communication Element may comprise at least one of a ProSe Function or a ProSe KMS.

According to examples of the invention, the method may further comprise sending a direct communication key identifier to the device.

According to examples of the invention, the method may further comprise checking that the device is authorised to establish direct communication with the UE and/or that the UE is authorised to establish direct communication with the device.

According to examples of the invention, if the UE is comprised within a first communication network and the device is comprised within a second communication network, the Direct Communication Element may comprise a first sub-Element in the first communication network and a second sub-Element in the second communication network. In some examples, the first sub-Element may be a ProSe Function or ProSe KMS in a home PLMN of the UE and the second sub-Element may be a ProSe Function or ProSe KMS in a home PLMN of the device.

According to examples of the invention, if the UE is comprised within a first communication network and the device is comprised within a second communication network, sending to and receiving from at least one of the BSF or the device may comprise sending to and receiving from one of the first or second sub-Elements via the other of the first or second sub-Elements. In some examples, in which the sub-Elements comprise ProSe Functions in different PLMNs, the communication between sub-Elements may be over a PC6 interface.

According to examples of the invention, if the UE is comprised within a first communication network and the device is comprised within a second communication network, sending to and receiving from the BSF may comprise sending and receiving at the first sub-Element, and deriving the UE delivery key may comprise deriving the direct communication key at the second sub-Element.

According to another aspect of the present invention, there is provided a computer program configured, when run on a computer, to carry out a method according to any one of the preceding aspects of the present invention.

According to another aspect of the present invention, there is provided a computer program product comprising computer readable medium and a computer program according to the preceding aspect of the present invention stored on the computer readable medium.

According to another aspect of the present invention, there is provided a system for securing direct communication between a User Equipment device, UE, and a device over an interface, the system comprising a UE, a device and a Direct Communication Element. The UE is configured to establish a UE shared key with a Bootstrapping Server Function, BSF, using a Generic Bootstrapping Architecture, GBA, procedure; to receive an encrypted direct communication key from the device, to derive a UE delivery key from at least the UE shared key, and to decrypt the encrypted direct communication key using the UE delivery key. The device is configured to receive a transaction identifier associated with the UE shared key from the UE; to send the transaction identifier to the Direct Communication Element; to receive the direct communication key and the direct communication key encrypted with the UE delivery key from the Direct Communication Element, and to send the encrypted direct communication key to the UE. The Direct Communication Element is configured to receive the transaction identifier from the device, to obtain a shared session key from the BSF; to derive the UE delivery key; to generate the direct communication key; to encrypt the direct communication key with the UE delivery key, and to send the direct communication key and the encrypted direct communication key to the device.

According to some examples of the invention, the UE may be configured to derive the UE delivery key by deriving the shared session key from at least the UE shared key and a Direct Communication Element identifier, and by deriving the UE delivery key from at least the shared session key and a device identifier.

According to some examples of the invention, the Direct Communication Element may be configured to derive the UE delivery key from at least the shared session key and a device identifier.

According to examples of the invention, the Direct Communication Element may be configured to generate the direct communication key using a random number generator.

According to some examples of the invention, the interface may comprise a Proximity Services, ProSe, interface, and the Direct Communication Element may comprise at least one of a ProSe Function or a ProSe KMS.

According to another aspect of the present invention, there is provided a User Equipment device, UE, configured for obtaining a key for direct communication with a device over an interface, the UE comprising a processor and a memory, the memory containing instructions executable by the processor, such that the UE is operable to carry out a method according to the first aspect of the present invention.

According to another aspect of the present invention, there is provided a device configured for obtaining a key for direct communication with a User Equipment device, UE, over an interface, the device comprising a processor and a memory, the memory containing instructions executable by the processor, such that the device is operable to carry out a method according to the second aspect of the present invention.

According to another aspect of the present invention, there is provided a Direct Communication Element configured for establishing a key for direct communication over an interface between a User Equipment device, UE, and a device, the Direct Communication Element comprising a processor and a memory, the memory containing instructions executable by the processor, such that the Direct Communication Element is operable to carry out a method according to the third aspect of the present invention.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide methods enabling the establishment of a Direct Communication Key for securing communication between a UE and a device, which may itself be a UE or may be a UE-to-Network Relay. Aspects of the invention make use of the Generic Bootstrapping Architecture (GBA) in 3GPP networks to assist in the establishing of the Direct Communication key.

Figure 1:
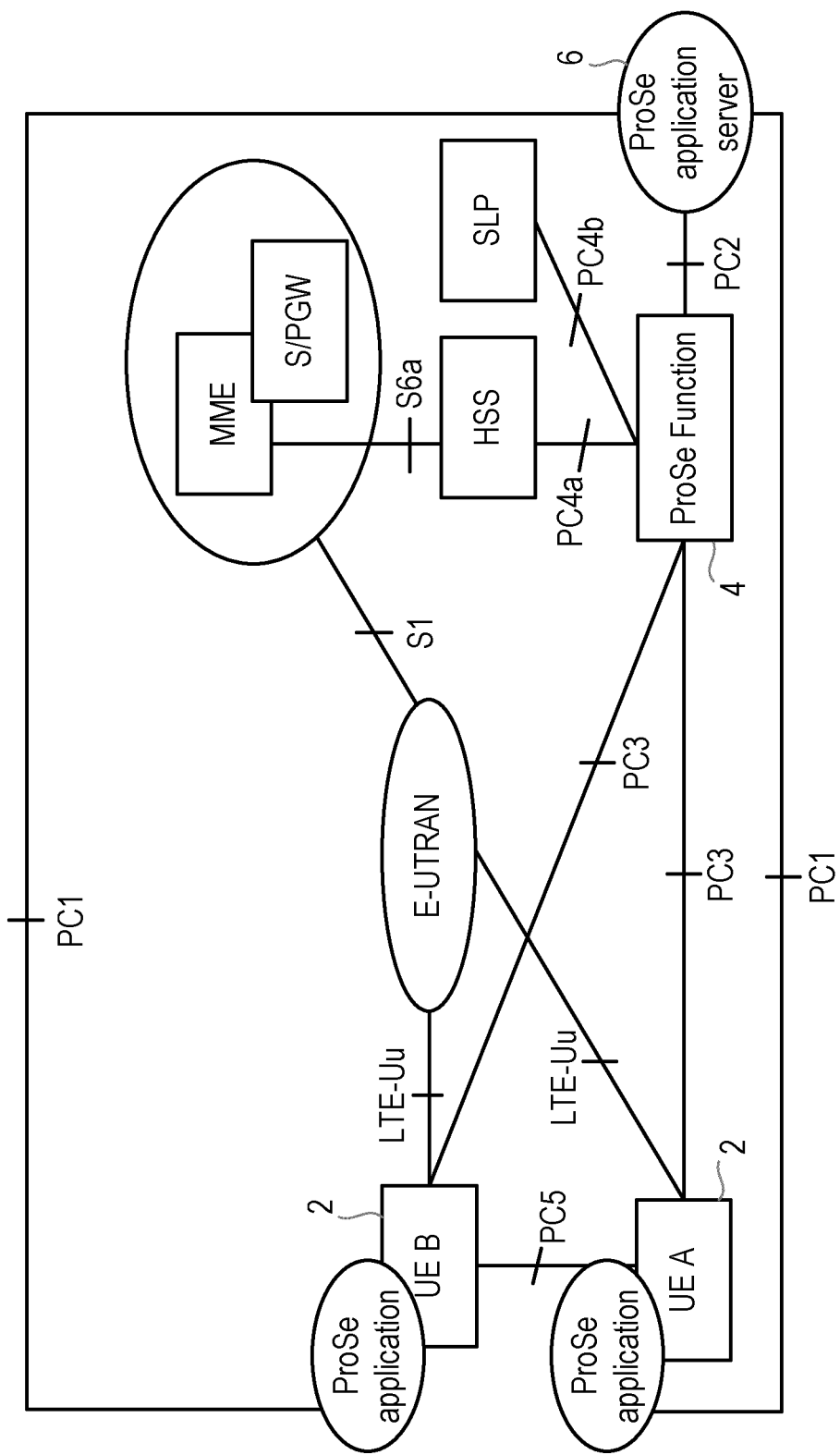
FIG. 1 is a schematic representation of a Proximity Services (ProSe) architecture.
Figure 2:
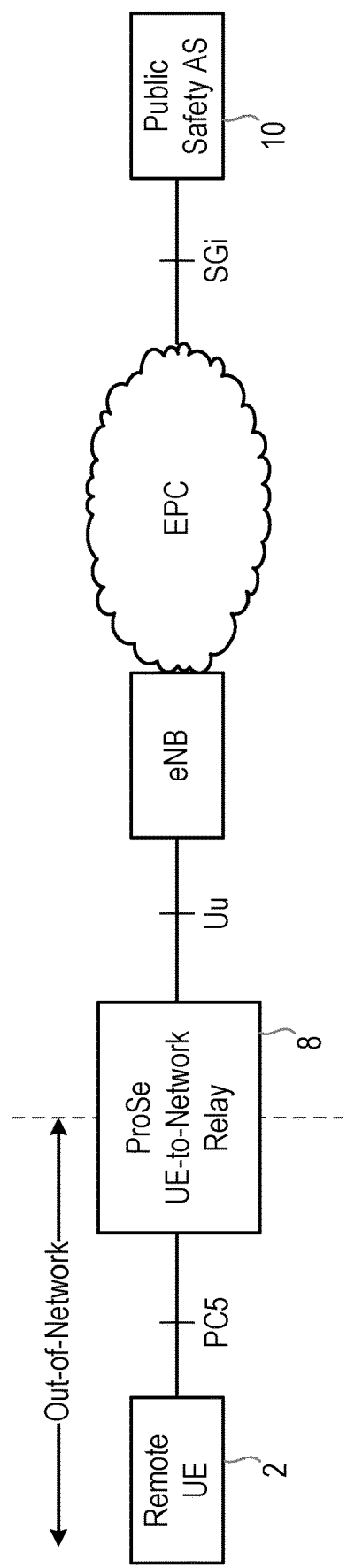
FIG. 2 is a representation of ProSe including a UE-to-Network Relay.
Figure 3:
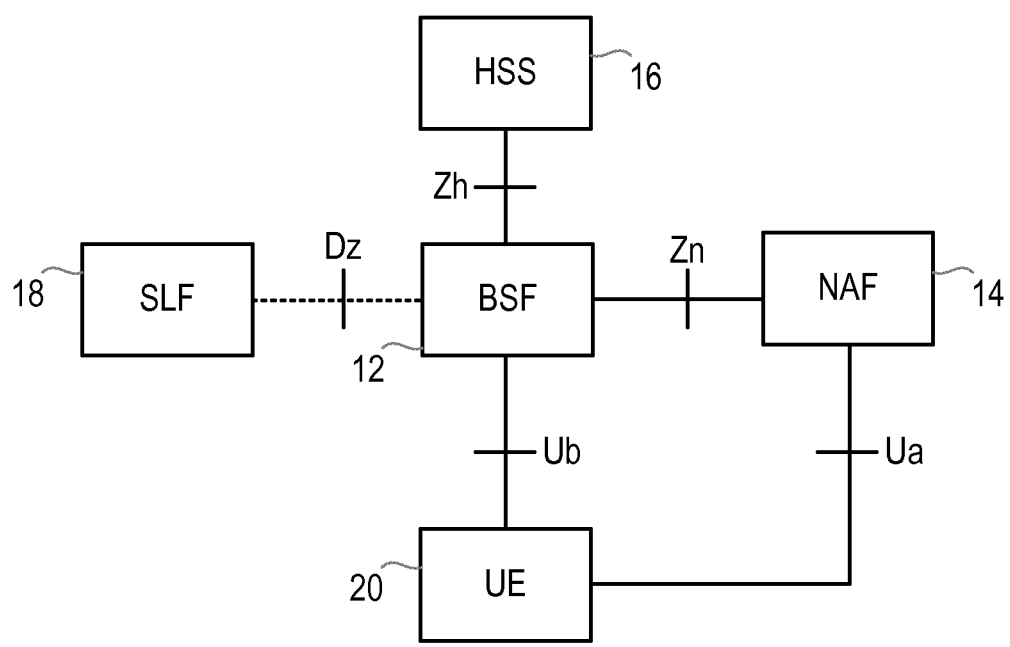
FIG. 3 is a schematic representation of a Generic Bootstrapping Architecture (GBA)

FIG. 3 illustrates a reference GBA architecture. GBA is a framework which uses network operator controlled credentials, such as 3GPP Authentication and Key Agreement (AKA) credentials, in the Universal Integrated Circuit Card (UICC) of devices to provide keys for application security. The reference GBA architecture comprises a UE 20, a Bootstrapping Server Function (BSF) 12, a Network Application Function (NAF) 14, a Home Subscription Server (HSS) 16 and a Subscriber Location Function (SLF) 18. Exchanges between the BSF 12 and UE 20 through the reference point Ub enable the establishing of key material Ks in both the BSF 12 and UE 20. The BSF 12 and UE 20 may then each independently generate a NAF specific key, for example a Ks_NAF, which will be used to secure the reference point Ua between the UE 20 and the NAF 14. Ks_NAF is generated using a Key Derivation Function (KDF) with inputs including the key material Ks, the IMPI of the UE 20 and an identification of the NAF 14. The BSF 12 supplies the UE with a Bootstrapping Transaction Identifier (B-TID) corresponding to the exchange as well as a lifetime of the key material Ks. The UE 20 may then supply the B-TID to the NAF 14, enabling the NAF 14 to request the key corresponding to the B-TID from the BSF 12. In response to the request, the BSF 12 supplies Ks_NAF to the NAF 14, meaning the UE 20 and NAF 14 may communicate securely through the reference point Ua using Ks_NAF.

Aspects of the present invention employ the reference GBA architecture, with enhanced functionality in the element operating as a NAF, to establish a shared key between a UE and a device that may be used over a direct communication interface such as ProSe PC5 interface. In brief, a UE acting according to examples of the present invention initiates GBA bootstrapping with a BSF. Following GBA bootstrapping, a UE shared key Ks is present in both the UE and the BSF. The UE contacts the device for direct communication and furnishes the B-TID received from the BSF during initial bootstrapping along with an identifier of a Direct Communication Element (DCE) which is to act as a NAF. The device contacts the identified DCE and provides the received B-TID as well as its own identification. The DCE retrieves a session shared key, for example a Ks_NAF, Ks_int_NAF or Ks_ext_NAF, from the BSF using the B-TID and derives the UE delivery key K_UE2NW from the session shared key and an identity of the device. The UE delivery key is thus unique both to the UE and the device for direct communication. Additional inputs and/or processing may be used in deriving the UE delivery key K_UE2NW. The DCE then generates a key for direct communication between the UE and the device, K_DC, and encrypts K_DC with the UE delivery key. The DCE may also protect the integrity of the direct communication key with the UE delivery key. The DCE then provides the direct communication key K_DC and the encrypted direct communication key encrypted(K_DC) to the device. The device keeps the direct communication key and forwards the encrypted direct communication key to the UE. The UE derives the session shared key from the UE shared key Ks and additionally derives the UE delivery key K_UE2NW from the session shared key and an identity of the device in the same manner as the DCE. The identity of the device may be sent by the device with the encrypted direct communication key and/or may for example have been obtained during a discovery procedure. The UE, having derived the UE delivery key, is then able to decrypt the direct communication key and to verify the integrity of the direct communication key, if appropriate. Both the UE and the device are then in possession of the direct communication key K_DC to secure communication between them over a direct communication interface. The DCE acting as a NAF in the provisioning of the direct communication key may be a ProSe Function or ProSe KMS operated by a 3GPP network operator. Alternatively, the DCE could be operated by a third party including for example a National Security or Public Safety organisation having an agreement with the 3GPP operator running the BSF.

Figure 4:
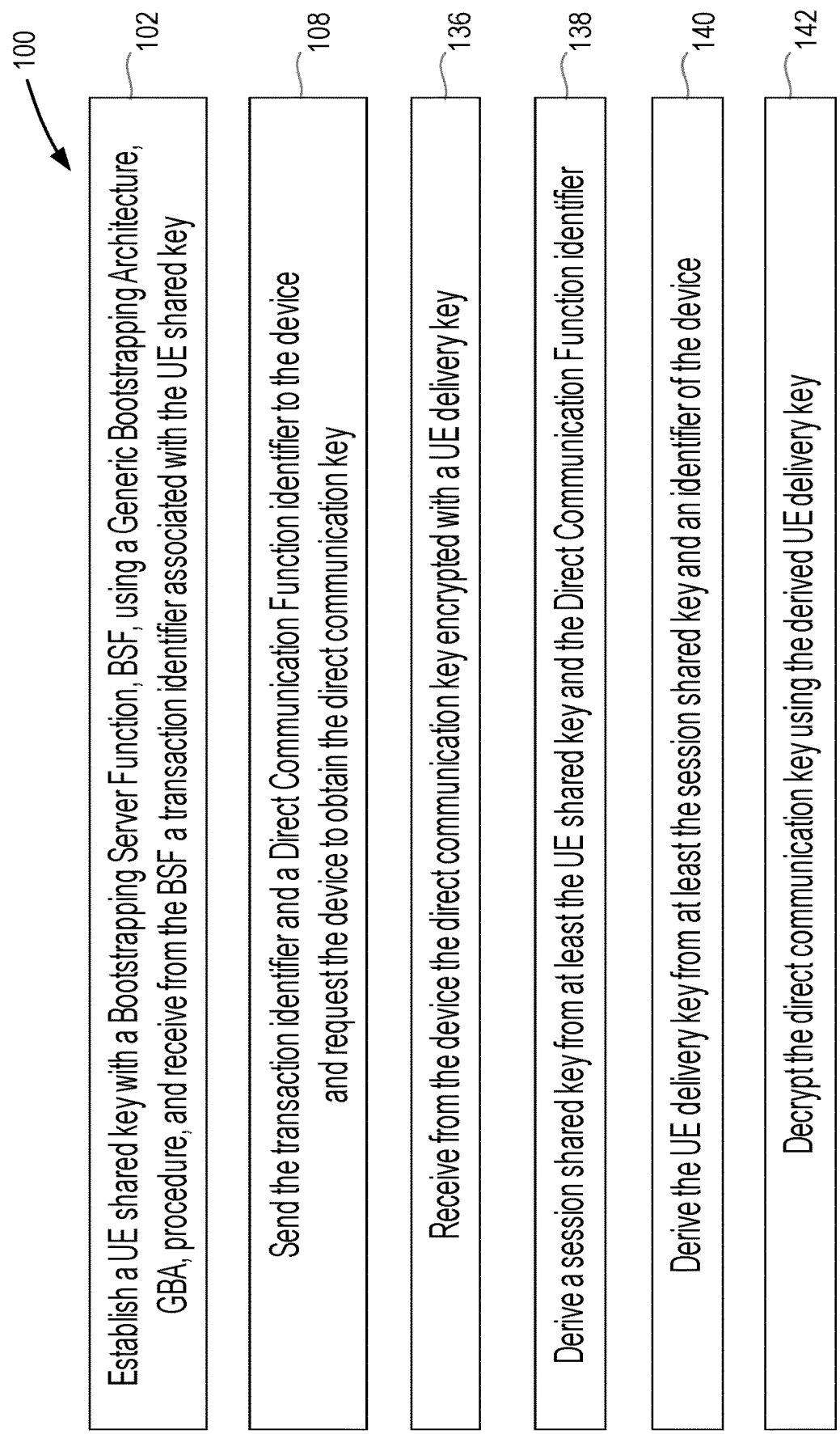
FIG. 4 is a flow chart illustrating process steps in a method performed by a UE for obtaining a key for direct communication with a device over an interface.
Figure 5:
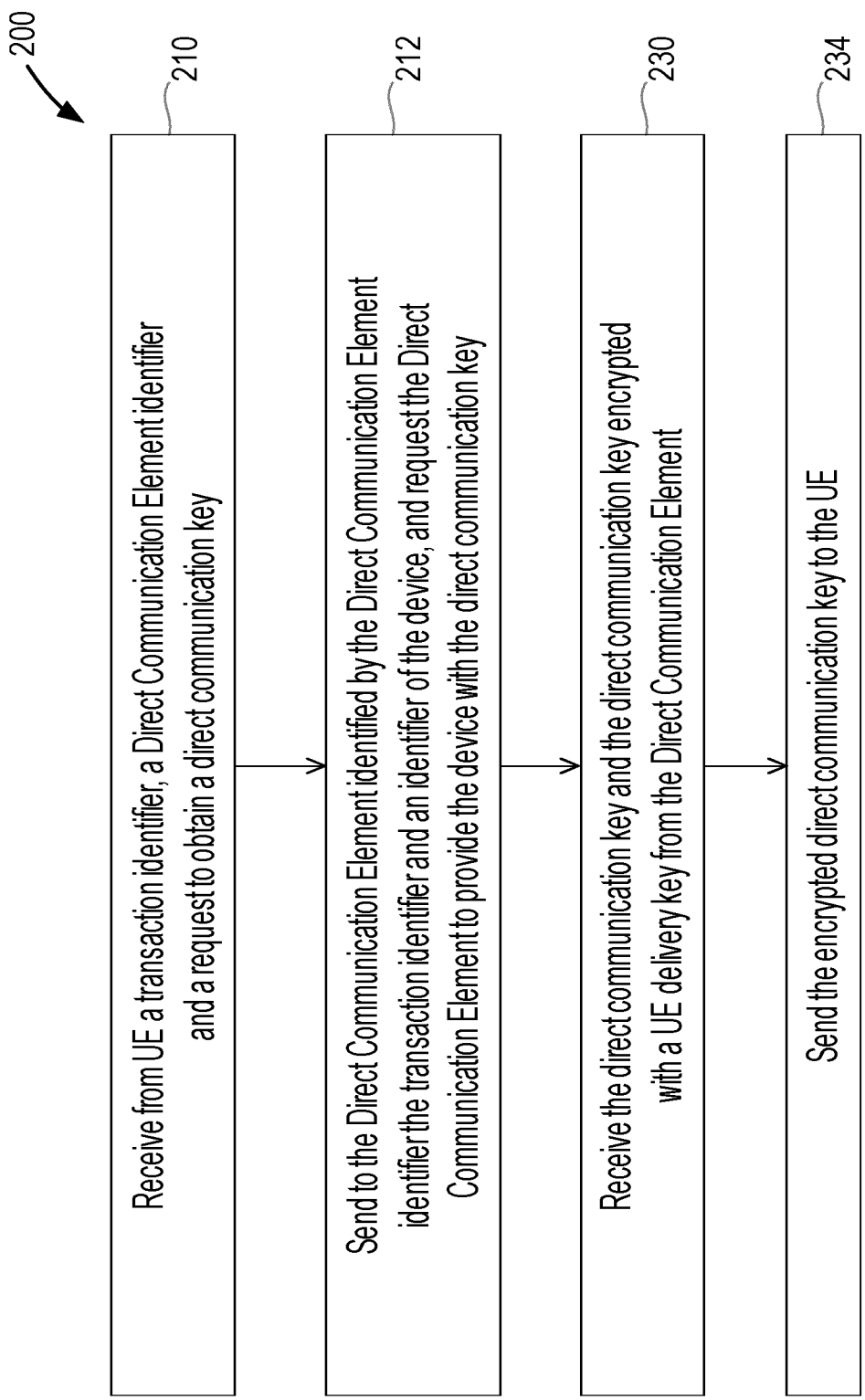
FIG. 5 is a flow chart illustrating process steps in a method performed by a device for obtaining a key for direct communication with a UE over an interface.
Figure 6:
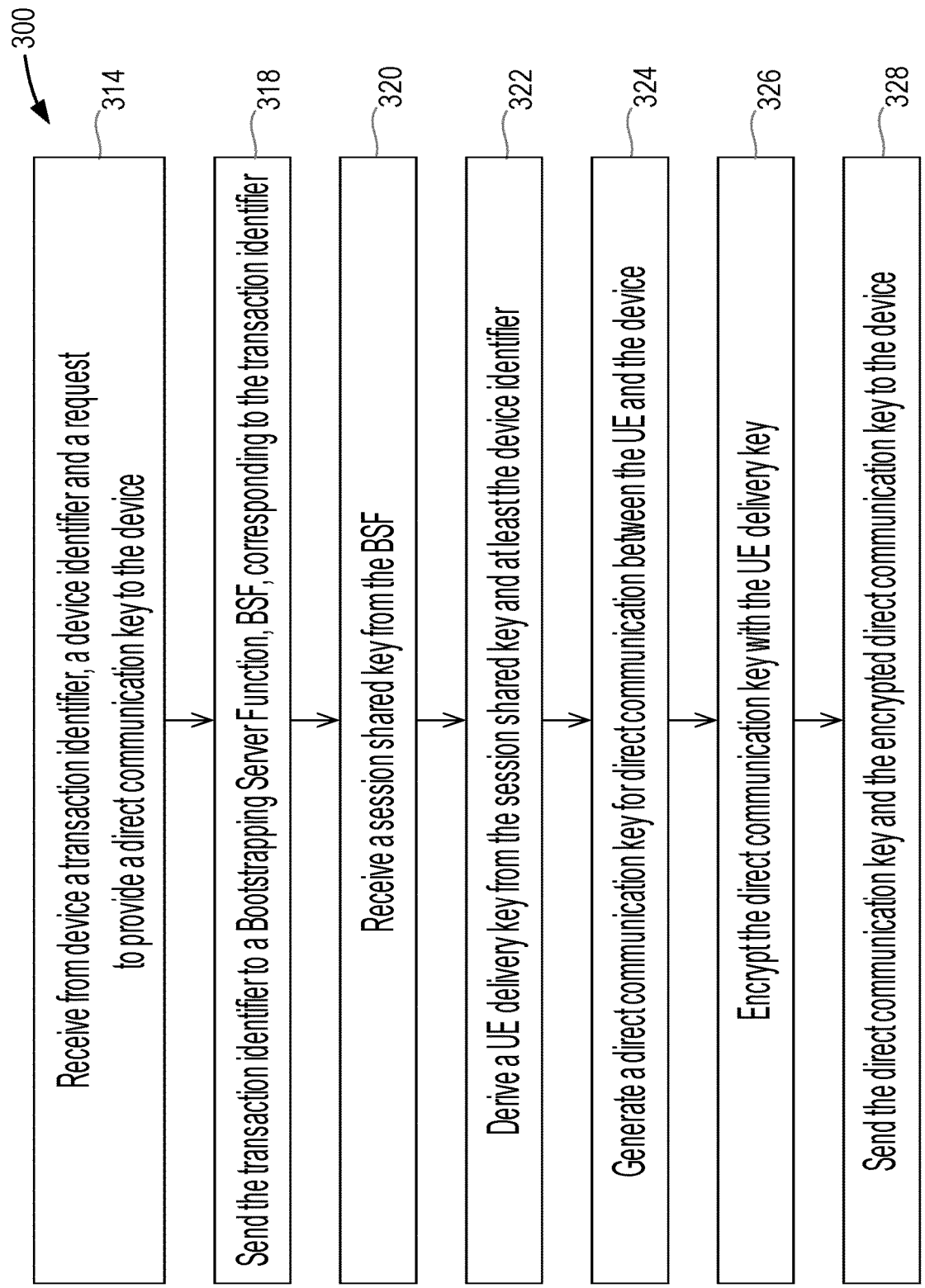
FIG. 6 is a flow chart illustrating process steps in a method performed by a Direct Communication Element for establishing a key for direct communication over an interface between a UE and a device.

FIGS. 4 to 6 illustrate methods according to aspects of the present invention performed in each of the UE, the device and the Direct Communication Element. Actions at each entity are described below with reference to FIGS. 4 to 6.

FIG. 4 illustrates steps in a method 100 carried out at a UE for obtaining a key for direct communication with a device, which device may be another UE or may be a UE-to-Network Relay. Referring to FIG. 4, in a first step 102, the UE establishes a UE shared key Ks with a BSF using a GBA procedure, and receives from the BSF a transaction identifier associated with the UE shared key. The UE then sends the transaction identifier and a Direct Communication Element identifier to the device and requests the device to obtain the direct communication key in step 108. In step 136, the UE receives from the device the direct communication key encrypted with a UE delivery key K_UE2NW. The UE then derives a session shared key from at least the UE shared key Ks and the Direct Communication Element identifier in step 138. The session shared key may for example be a Ks_NAF, Ks_int_NAF or Ks_ext_NAF. The UE then derives the UE delivery key K_UE2NW from at least the session shared key and an identifier of the device in step 140. The identifier of the device may for example have been received from the device with the encrypted direct communication key or may have been obtained via a discovery procedure. Finally, in step 142, the UE decrypts the direct communication key using the UE delivery key. The UE may also receive a direct communication key identifier, which may be stored in the UE with the decrypted direct communication key FIG. 5 illustrates steps in a method 200 performed by a device for obtaining a key for direct communication with a UE. The device may be a UE, a UE-to-Network Relay, or may be network node. Referring to FIG. 5, in a first step 210, the device receives from the UE a transaction identifier, a Direct Communication Element identifier and a request to obtain a direct communication key. The device then sends the transaction identifier and an identifier of the device to the Direct Communication Element identified by the Direct Communication Element identifier, and requests the Direct Communication Element to provide the device with the direct communication key in step 212. The Direct Communication Element may for example be a ProSe Function or ProSe KMS. The device receives the direct communication key and the direct communication key encrypted with a UE delivery key from the Direct Communication Element in step 230. Finally, in step 234, the device sends the encrypted direct communication key to the UE. The device may also receive a direct communication key identifier from the Direct Communication Element. The device may store the direct communication key identifier and may send it to the UE.

FIG. 6 illustrates steps in a method 300 performed by a Direct Communication Element (DCE) for establishing a key for direct communication over an interface between a UE and a device. The DCE may be a ProSe Function or a ProSe KMS, and the device may be a UE, a UE-to-Network Relay, or a Network node. Referring to FIG. 6, in a first step 314, the DCE receives from the device a transaction identifier, a device identifier and a request to provide a direct communication key K_DC to the device. The DCE then sends the transaction identifier to a BSF corresponding to the transaction identifier in step 318 and receives a session shared key from the BSF in step 320. The session shared key may be a Ks_NAF, Ks_int_NAF or Ks_ext_NAF. The DCE then derives a UE delivery key K_UE2NW from the session shared key Ks_NAF and at least the device identifier in step 322. The DCE generates the direct communication key K_DC for communication between the UE and the device in step 324 and encrypts the direct communication key with the UE delivery key in step 326. Finally, the DCE sends the direct communication key and the encrypted direct communication key to the device in step 328.

The step of deriving the UE delivery key, performed in the UE according to method 100 and in the DCE according to method 300, may be achieved in a range of different ways. In some examples, the UE delivery key may be derived using a Key Derivation Function (KDF), which may be any standard function such as the KDF defined in 3GPP TS 33.220. Additional parameters to the session shared key and the device ID mentioned above may be input to the KDF. Example additional input parameters include B-TID, NAF-ID, KMS-ID, ProSe UE-ID, CK||IK and other inputs. The order of the input parameters may also be varied. The selection of additional parameters and the variation in their order may in some examples result in a more secure generation function. In addition, the input parameters may be transformed, hashed or otherwise processed before they are input to the KDF to derive the UE delivery key. For example, a Ks_NAF could be transformed by first being run through another (or the same) key derivation function and the result input to the KDF, or another character sting could be used as input. In the following description, references to the derivation of a UE delivery key include the above disclosed options for additional inputs and KDFs.

The step of generating a direct communication key, performed by the DCE according to method 300 may be conducted using a random number generator. The direct communication key is thus not derived from or related to the identities of the UE and device whose direct communication it will be used to secure. The direct communication key may be associated with a key identifier which may be used in the UE and the device to associate the key with the particular direct communication partners whose communication it is intended to secure. In addition, the direct communication key is delivered to the UE in an encrypted form, encrypted with a UE delivery key which is unique both to the UE and to the device for direct communication. In this manner, only the specific UE which requested the direct communication key for direct communication with the device can decrypt and use the direct communication key, so ensuring that the direct communication between the UE and the device is secure.

Figure 7:
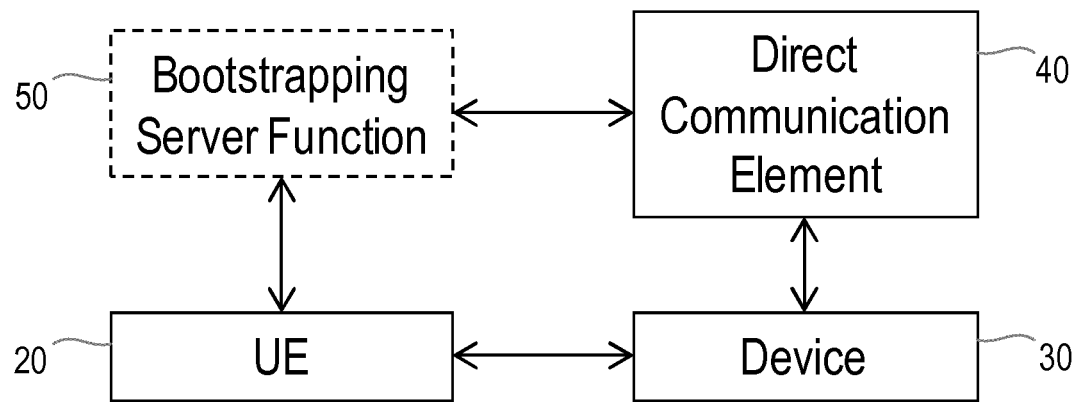
FIG. 7 is a schematic representation of a system for securing direct communication between a User Equipment device, UE, and a device over an interface.

The above described methods 100, 200, 300 may be performed by elements cooperating to form a system for securing direct communication between a UE and a device over an interface. Such a system is illustrated in FIG. 7 and comprises a UE 20, a device 30 and a Direct Communication Element 40. The UE is configured to establish a UE shared key Ks with a BSF 50 using a GBA procedure. The UE is further configured to receive an encrypted direct communication key from the device, to derive a UE delivery key from at least the UE shared key, and to decrypt the encrypted direct communication key using the UE delivery key. The device 30 is configured to receive a transaction identifier associated with the UE shared key from the UE 20, to send the transaction identifier to the DCE 40 and to receive the direct communication key and the direct communication key encrypted with the UE delivery key from the DCE 40. The device 30 is also configured to send the encrypted direct communication key to the UE 20. The DCE 40 is configured to receive the transaction identifier from the device 30, to obtain a shared session key from the BSF 50, to derive the UE delivery key, to generate the direct communication key, to encrypt the direct communication key with the UE delivery key, and to send the direct communication key and the encrypted direct communication key to the device 30.

The following discussion illustrates further examples of the invention with reference to ProSe communication as supported by a 3GPP network. However it will be appreciated that the invention is equally applicable to other direct communication technologies.

As discussed above, the device 30, at which the method 200 is performed, may be a UE or may be a UE-to-Network Relay. Both of these options for the device are discussed in the following examples. When discussing an example in which the device is a UE, the UE is referred to as "UE-A" and the device is referred to as "UE-B". When discussing an example in which the device is a UE-to-Network Relay, the UE is referred to as "Remote UE" and the device is referred to as "UE-to-NW Relay". It will be appreciated that the example cases are merely for illustration, and method steps performed at UE-A may be mapped to those performed at the Remote UE, and similarly the method steps performed at UE-B may be mapped to the method steps performed at the UE-to-NW Relay. In either case it is assumed that both the UE and the device have a UICC and are enabled for ProSe. The UE may be served by the E-UTRAN throughout the performance of the method 100 or may move out of contact with the E-UTRAN following completion of the initial bootstrapping procedure. This is particularly likely in the case of a device which is a UE-to-Network Relay, as it is likely that any UE within the coverage area of a UE-to-Network Relay will have left the coverage area of the E-UTRAN.

Regardless of the nature of the device, it is possible that the UE and device may be belong to the same Home PLMN or may be belong to different Home PLMNs. Example applications of methods according to the present invention are described below for both these scenarios. The following example applications illustrate different ways in which the steps of the methods 100, 200, 300 described above may be implemented to achieve the above discussed functionality.

Example i) UE and Device in Same HPLMN

Figure 8:
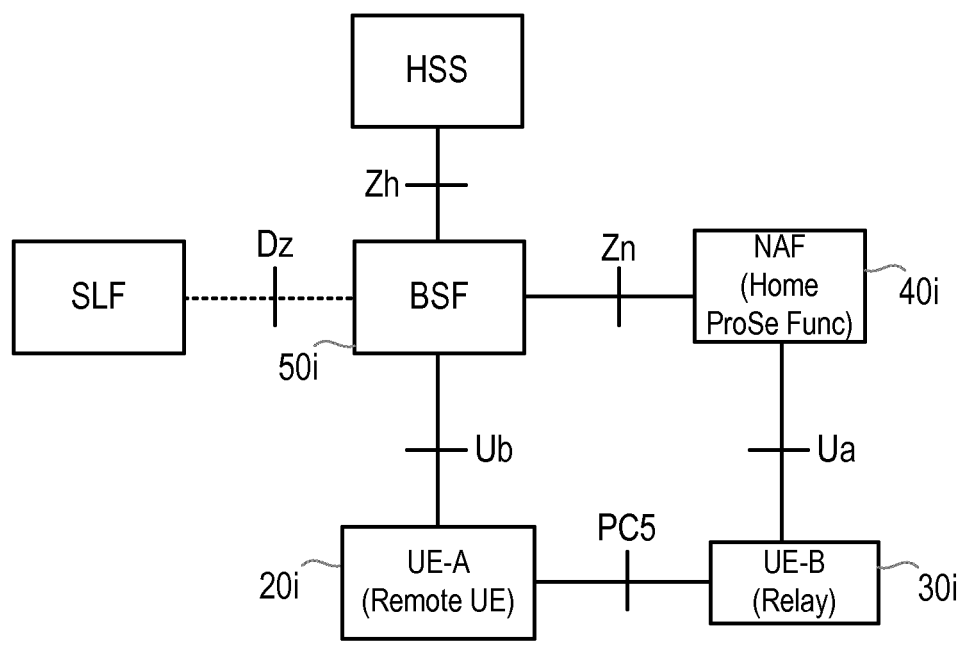
FIG. 8 is a representation of an example architecture for conducting the methods of FIGS. 4 to 6.
Figure 9:
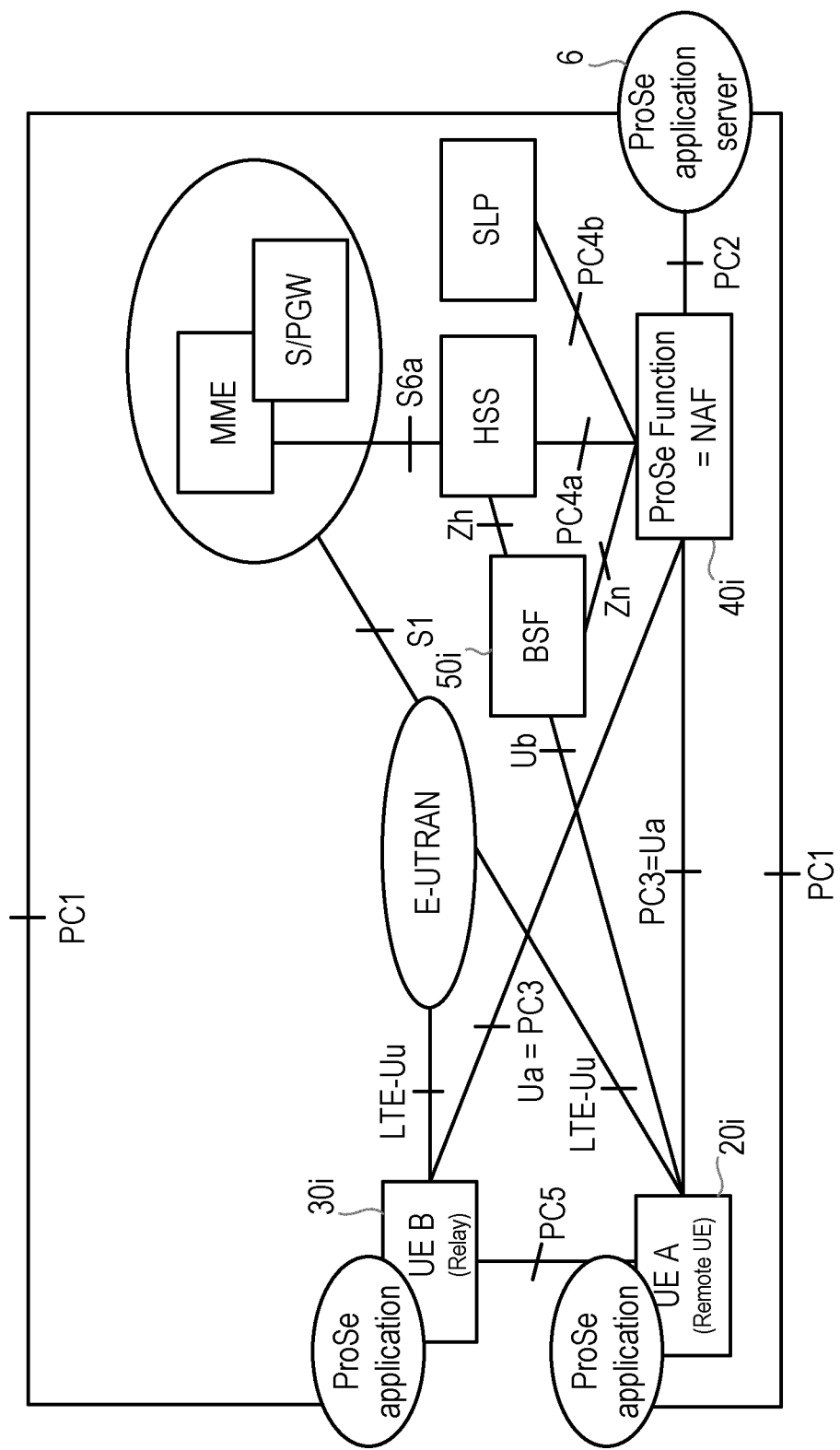
FIG. 9 is a representation of an example architecture for conducting the methods of FIGS. 4 to 6 over ProSe.

The GBA and ProSe architecture for this example are illustrated in FIGS. 8 and 9. According to this example, the UE, referred to as UE-A (Remote UE) 20*i*, and the device, referred to as UE-B (UE-to-NW Relay) 30*i*, are both served by the E-UTRAN in the same HPLMN. UE-A (Remote UE) 20*i* initiates GBA bootstrapping with the BSF 50*i* according to TS 33.220. UE-A (Remote UE) 20*i* retrieves a B-TID from the BSF 50*i*. Initial bootstrapping takes place with UE-A (Remote UE) 20*i* in E-UTRAN coverage but subsequent steps may take place with UE-A (Remote UE) 20*i* out of E-UTRAN coverage, for example if UE-B 30*i* is acting as a relay or is in fact a UE-to-NW relay 30*i*.

UE-B (UE-to-NW Relay) 30*i* is using ProSe Direct Discovery procedures to allow UEs in the vicinity to discover it. UE-A (Remote UE) 20*i* discovers UE-B (UE-to-NW Relay) 30*i* using ProSe Direct Discovery procedures on PC5 interface, for example having moved into the cell in which UE-B (UE-to-NW Relay) 30*i* is located.

UE-A (Remote UE) 20*i* contacts UE-B (UE-to-NW Relay) via the PC5 interface indicating the B-TID and an identity of the DCE 40*i*, which in this case is the Home ProSe Function of the PLMN, which is acting as a NAF for the purposes of GBA. UE-A (Remote UE) 20*i* may also provide its identity, for example if this has not already been provided via discovery. UE-A (Remote UE) 20*i* requests UE-B (UE-to-NW Relay) 30*i* to contact the NAF 40*i* to request the NAF 40*i* to provide a key for direct communication UE-B (UE-to-Network Relay) then contacts the NAF 40*i* with the B-TID and UE-B (UE-to-NW Relay) 30*i* identity. If the NAF 40*i* does not have the session shared key identified by the B-TID already, then the NAF 40*i* contacts the BSF 50*i* with the B-TID and retrieves the corresponding session shared key. The session shared key is referred to in the present and following examples as a Ks_NAF for the purposes of illustration. However it will be appreciated that the session shared key may also or alternatively comprise other NAF specific keys such as Ks_int_NAF and Ks_ext_NAF. The NAF 40*i* derives a UE delivery key K_UE2NW from the Ks_NAF and UE-B (UE-to-NW Relay) 30*i* identity. The NAF 40*i* then generates the requested direct communication key K_DC for use in direct communication between UE-A (Remote UE) 20*i* and UE-B (UE-to-Network Relay) 30*i*, for example using a random number generator. The NAF 40*i* protects the direct communication key K_DC with the UE delivery key and provides the direct communication key and the protected direct communication key to UE-B (UE-to-NW Relay) 30*i* over a secure link.

UE-B (UE-to-NW Relay) 30*i* stores the direct communication key and sends the protected direct communication key to UE-A (Remote UE) 20*i*. UE-A (Remote UE) 20*i* derives the shared session key Ks_NAF from its initial bootstrapping procedures and then derives the UE delivery key K_UE2NW from Ks_NAF and the UE-B (UE-to-NW Relay) 30*i* identity. This identity may be received from the UE-B (UE-to-NW Relay) 30*i* with the protected direct communication key and/or may be obtained during the discovery procedure. UE-A (Remote UE) then unprotects the direct communication key using the UE delivery key K_UE2NW. The direct communication key K_DC is then available in UE-A (Remote UE) 20*i* and UE-B (UE-to-Network Relay) for direct communication between UE-A (Remote UE) 20*i* and UE-B (UE-t-Network Relay) 30*i* on the PC5 interface.

The above steps are described in greater detail below with reference to the messaging flow diagram in FIG. 10.

In step 102*i* (message exchanges 1 to 4) UE-A (Remote UE) 20*i* is served by E-UTRAN and initiates a GBA bootstrapping with the BSF 50*i* according to TS 33.220. When the GBA bootstrapping procedure has taken place successfully then the UE-A (Remote UE) 20*i* and the BSF 50*i* have established a UE shared key Ks, a B-TID and a key lifetime of the Ks.

Following step 102*i*, UE-A (Remote UE) 20*i* may move outside of E-UTRAN coverage. In message exchange 5, UE-B (UE-to-NW Relay) 30*i* is served by E-UTRAN and initiates E-UTRAN Attach and requests PDN connectivity.

UE-A (Remote UE) 20*i* and UE-B (UE-to-NW Relay) 30*i* then discover each other through Direct Discovery procedures using Direct Discovery Model A or Direct Discovery Model B at message exchange 6. Discovery may be initiated by either UE-A (Remote UE) 20*i* or UE-B (UE-to-NW Relay) 30*i*. In the illustrated example, discovery is initiated by UE-B (UE-to-NW Relay) 30*i*. In step 204*i*, UE-B (UE-to-NW Relay) 30*i* issues a discovery message, which may be a Direct Discovery broadcast according to ProSe Model A or a Direct Discovery request message according to ProSe Model B. UE-A (Remote UE) 20*i* receives the discovery message at step 106*i*. UE-A (Remote UE) 20*i* may respond to the Direct Discovery request message according to ProSe Model B or may issue a request message in response to a Direct Discovery broadcast according to ProSe Model A.

In the procedure illustrated at message exchange 8, UE-A (Remote UE) 20*i* requests UE-B (UE-to-NW Relay) 30*i* to contact the NAF 40*i* in order to request the NAF 40*i* to provide the direct communication key, to be used for direct communication on the PC5 interface. The direct communication key is to be protected with the UE delivery key, derived from a Ks_NAF identified by a B-TID sent by UE-A (Remote UE). UE-A (Remote UE) 20*i* sends the request to UE-B (UE-to-NW Relay) 30*i* on the PC5 interface in step 108*i*. The request contains the B-TID and the NAF_ID and is received by UE-B (UE-to-NW Relay) 30*i* in step 210*i*. The request may also contain the UE-A (Remote UE) 20*i* identity, for example if this has not already been provided during discovery.

In message exchange 9, UE-B (ProSe UE-to-Network Relay) 30*i* contacts the NAF 40*i* over the interface PC3 by initiating the establishment of a secure link with the NAF 40*i*. This may comprise initiating, for example, a TLS tunnel using pre-shared certificates or with GBA.

In message exchange 10, UE-B (ProSe UE-to-Network Relay) 30*i* requests the NAF 40*i* to provide the direct communication key. UE-B (ProSe UE-to-Network Relay) 30*i* sends the message at step 212*i*, including the B-TID received from UE-A (Remote UE) 20*i* and the UE-B identity (UE-to-NW Relay identity). The message may also contain the UE-A (Remote UE) 20*i* identity. This message is received by the NAF 40*i* at step 314*i*. In step 316*i* (message exchange 11), the NAF 40*i* authorizes the UE-B identity (UE-to-NW Relay identity) by checking a database with a list of authorized identities. This database may be local and supported by the NAF 40*i* or may be implemented in a different network server. The NAF 40*i* may also authorize the UE-A (Remote UE) 20*i* identity by checking the database.

If the UE-B identity (UE-to-NW Relay identity), and UE-A (Remote UE) 20*i* identity if checked, are configured in the database, then the UE-B (UE-to-NW Relay) 30*i* and UE-A (Remote UE) 20*i* are authorized to establish direct communication, and the UE-B (UE-to-NW Relay) 30*i* is authorized to request the key corresponding to the B-TID. The NAF 40*i* therefore contacts the BSF 50*i* in step 318*i* to request the session shared key Ks_NAF, as described in TS 33.220, and receives Ks_NAF from the BSF 50*i* in step 320*i*.

In message exchange 12, the NAF 40*i* generates and protects the direct communication key. This is achieved via steps 322*i*, 324*i* and 326*i*. In step 322*i*, the NAF 40*i* derives the UE delivery key K_UE2NW from Ks_NAF and UE-B ID (UE-to-Network Relay ID) as follows:

K_UE2NW=KDF(Ks_NAF, UE-B ID (UE-to-NW Relay ID), . . . )

KDF is a key derivation function having as inputs at least Ks_NAF and UE-B ID (UE-to-NW Relay ID). Additional inputs may be included, and processing of the inputs before inputting to the KDF may take place.

Figure 10:
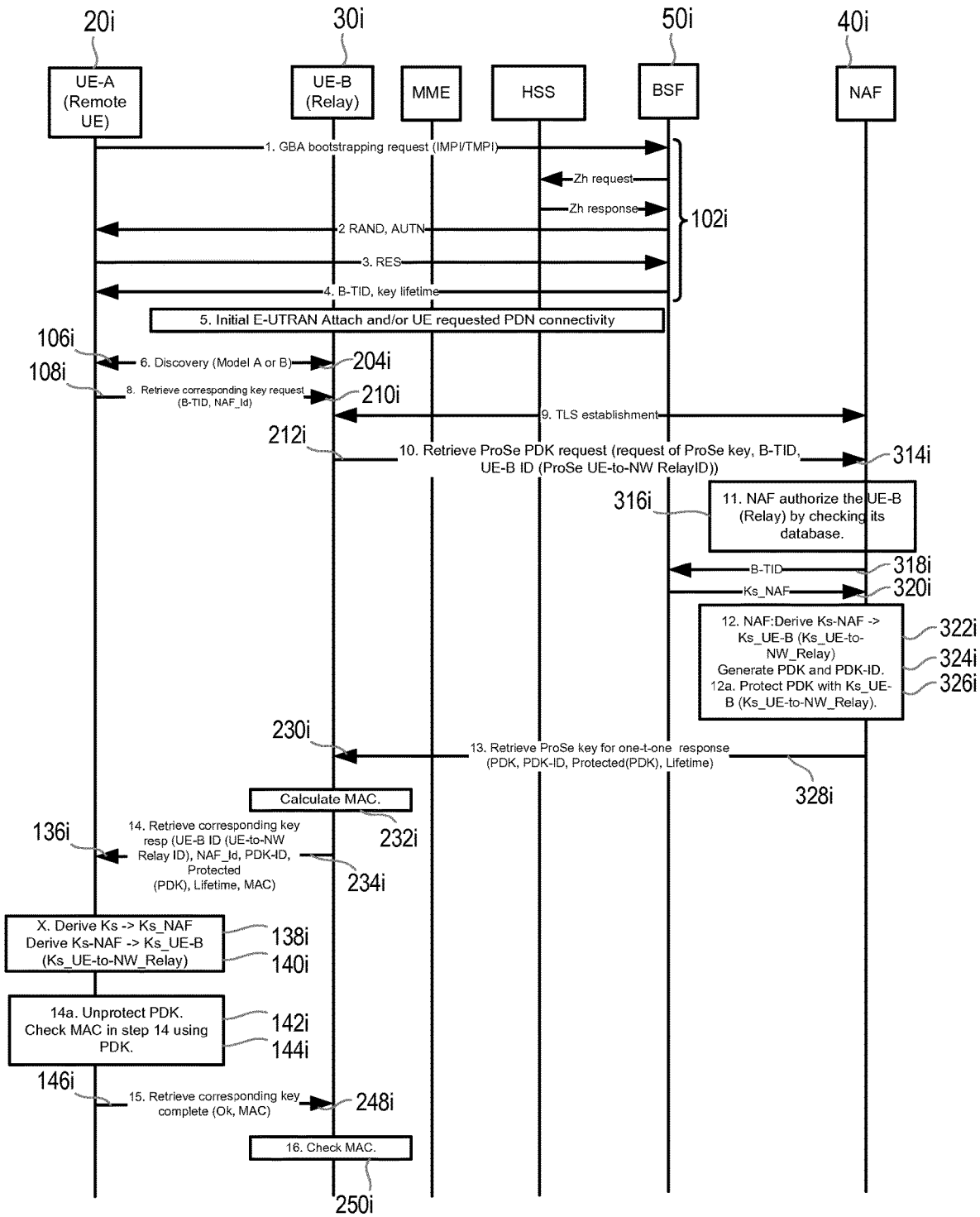
FIG. 10 is a message flow illustrating an example implementation of the methods of FIGS. 4 to 6 over ProSe.

In step 324*i*, the NAF 40*i* generates the direct communication key K_DC (labelled as the ProSe Direct Communication Key (PDK) in FIG. 10). The direct communication key K_DC is generated using a random number generator. The NAF 40*i* also generates a direct communication key ID K_DC ID and may generate a direct communication key lifetime. In step 326*i*, the NAF protects the generated direct communication key K_DC using the derived UE delivery key K_UE2NW. Protecting includes encrypting K_DC with the UE delivery key K_UE2NW and may also include protecting the integrity of K_DC with the UE delivery key.

In message exchange 13, the NAF 40*i* sends or provisions the direct communication key K_DC, the protected direct communication key protected(K_DC) and the K_DC identity and lifetime to UE-B (UE-to-NW Relay) 30*i*. The NAF 40*i* sends a message containing the keys in step 328*i*, which message is received by UE-B (UE-to-NW Relay) 30*i* in step 230*i*.

UE-B (UE-to-Network Relay) 30*i* stores the direct communication key and the direct communication key identifier. It then generates a MAC using the direct communication key at step 232*i* and sends the protected direct communication key, the direct communication key identity and its own identity, with the generated MAC, to UE-A (Remote UE) in a message sent at step 234*i* (message exchange 14). This message is received by UE-A (Remote UE) at step 136*i*.

In the procedure illustrated at message exchange X, UE-A (Remote UE) 20*i* derives the UE delivery key K_UE2NW. This process is achieved in steps 138*i* and 140*i* in UE-A (Remote UE) 20*i*. In step 138*i*, UE-A (Remote UE) calculates the shared session key Ks_NAF from Ks and the NAF_ID as follows:

Ks_NAF=KDF(Ks, NAF_ID, . . . )

Where KDF is a key derivation function having as inputs at least Ks and NAF_ID. Additional inputs may be included, and processing of the inputs before inputting to the KDF may take place.

In step 140*i*, UE-A (Remote UE) 20*i* calculates the UE delivery key K_UE2NW from Ks_NAF and the UE-B ID (UE-to-NW Relay ID) as follows:

K_UE2NW=KDF(Ks_NAF, UE-B ID (UE-to-NW Relay ID), . . . )

UE-A (Remote UE) 20*i* thus generates the same UE delivery key as the NAF 40*i*, using the same derivation procedure. As discussed above, KDF is a key derivation function having as inputs at least Ks_NAF and UE-B ID (UE-to-NW Relay ID). Additional inputs may be included, and processing of the inputs before inputting to the KDF may take place.

In message exchange 14a, UE-A (Remote UE) 20i accesses the direct communication key and checks the MAC received from UE-B (UE-to-Network Relay). This is achieved via steps 142i and 144i. In step 142i, UE-A (Remote UE) unprotects the protected direct communication key using the UE delivery key which it derived at step 140i. This may comprise decrypting the direct communication key and verifying its integrity. In step 144i, UE-A (Remote UE) 20i checks the MAC received from UE-B (UE-to-Network Relay) 30i in step 136i. The MAC is checked using the direct communication key used to generate the MAC, and which UE-A (Remote UE) has just unprotected. If the check is successful, then UE-A (Remote UE) 20i knows that UE-B (UE-to-NW Relay) 30i shares the same direct communication key K_DC as UE-A (Remote UE) 20i. UE-A (Remote UE) 20i can now use the direct communication key K_DC for direct communication on the PC5 interface with UE-B (UE-to-NW Relay) 30i.

In message exchange 15, UE-A (Remote UE) 20i confirms to UE-B (UE-to-NW Relay) 30i, that the check of the MAC was successful and that ProSe Direct Communication on PC5 interface between UE-A (Remote UE) 20i and UE-B (UE-to-NW Relay) 30i can now take place using the direct communication key. UE-A (Remote UE) 20i protects the confirmation with a MAC using the direct communication key. The confirmation message is sent by UE-A (Remote UE) 20i in step 146i and received at UE-B (UE-to-NW Relay) 30i in step 148i. The UE-B (UE-to-NW Relay) 30i then checks the MAC in step 244i (message exchange 16).

Mutual authentication may be included in the methods illustrated by the above described example in the following manner. UE-A (Remote UE) 20i and UE-B (UE-to-NW Relay) 30i may generate nonces for mutual authentication: UE-A (Remote UE) 20i generates nonce-UE-A and UE-B (UE-to-NW Relay) generates nonce-UE-B. A nonce may for example be a sequence number, a random value or a timestamp. Nonces may be exchanged in various messages of the above described example procedure. In one example, UE-A (Remote UE) 20i sends nonce-UE-A to UE-B (UE-to-NW Relay) 30i with the request to obtain a direct communication key sent in step 108i (message exchange 8). UE-B (UE-to-NW Relay) 30i takes nonce-UE-A as an input to its calculation of a MAC at step 232i, which MAC is sent to UE-A (Remote UE) 20i in step 234i. When UE-A (Remote UE) 20i verifies the MAC, this in practice means that UE-A (Remote UE) 20i authenticates UE-B (UE-to-NW Relay). An equivalent process allows authentication in the other direction. UE-B (UE-to-NW Relay) 30i sends nonce-UE-B to UE-A (Remote UE) 20i in step 234i (message exchange 14). UE-A (Remote UE) uses nonce-UE-B as an input to its MAC calculation, which MAC is sent to the UE-B (UE-to-NW Relay) in step 146i (message exchange 15). When UE-B (UE-to-NW Relay) 30i verifies the MAC, this in practice means that UE-B (UE-to-NW Relay) authenticates UE-A (Remote UE) 20i.

In alternative embodiments, of the above example, the UE-A (Remote UE) 20i may derive the ProSe key Ks_UE-B (Ks_UE-to-NW_Relay) at an earlier stage, for example if the UE-A (Remote UE) 20i has obtained the NAF-ID and the UE-B ID (UE-to-NW Relay ID) for example during the discovery. The UE-A (Remote UE) 20i may also already be in possession of the NAF ID. In addition, certain of the exchanges according to aspects of the invention may be combined with the discovery process. Each of these possibilities is described in full in the context of Example iii below.

Examples ii) and iii) UE and Device in Different HPLMNs

In examples in which the UE 20 and device 30 belong to different Home PLMNs, two scenarios may be envisaged:
1) The DCE of the device acts as NAF for GBA bootstrapping
2) The DCE of the UE acts as NAF for GBA bootstrapping In each scenario, the DCE may be the ProSe function of the relevant PLMN or may for example be a KMS of the relevant PLMN. In the following examples, the DCE is a ProSe function, but it will be appreciated that this is merely for the purposes of illustration. In some examples, the DCE may comprise a ProSe Function or KMS in each of the PLMNs, each Function or server acting as a sub-Element of the Direct Communication Element. For example, a ProSe Function in the UE PLMN may act as a NAF for the bootstrapping procedure, as a first sub-Element, with a ProSe Function in the device PLMN deriving the UE delivery key and generating the direct communication key, as a second sub-Element. However, only one DCE sub-Element acts as a NAF for the purposes of GBA bootstrapping at any one time.

Figure 11:
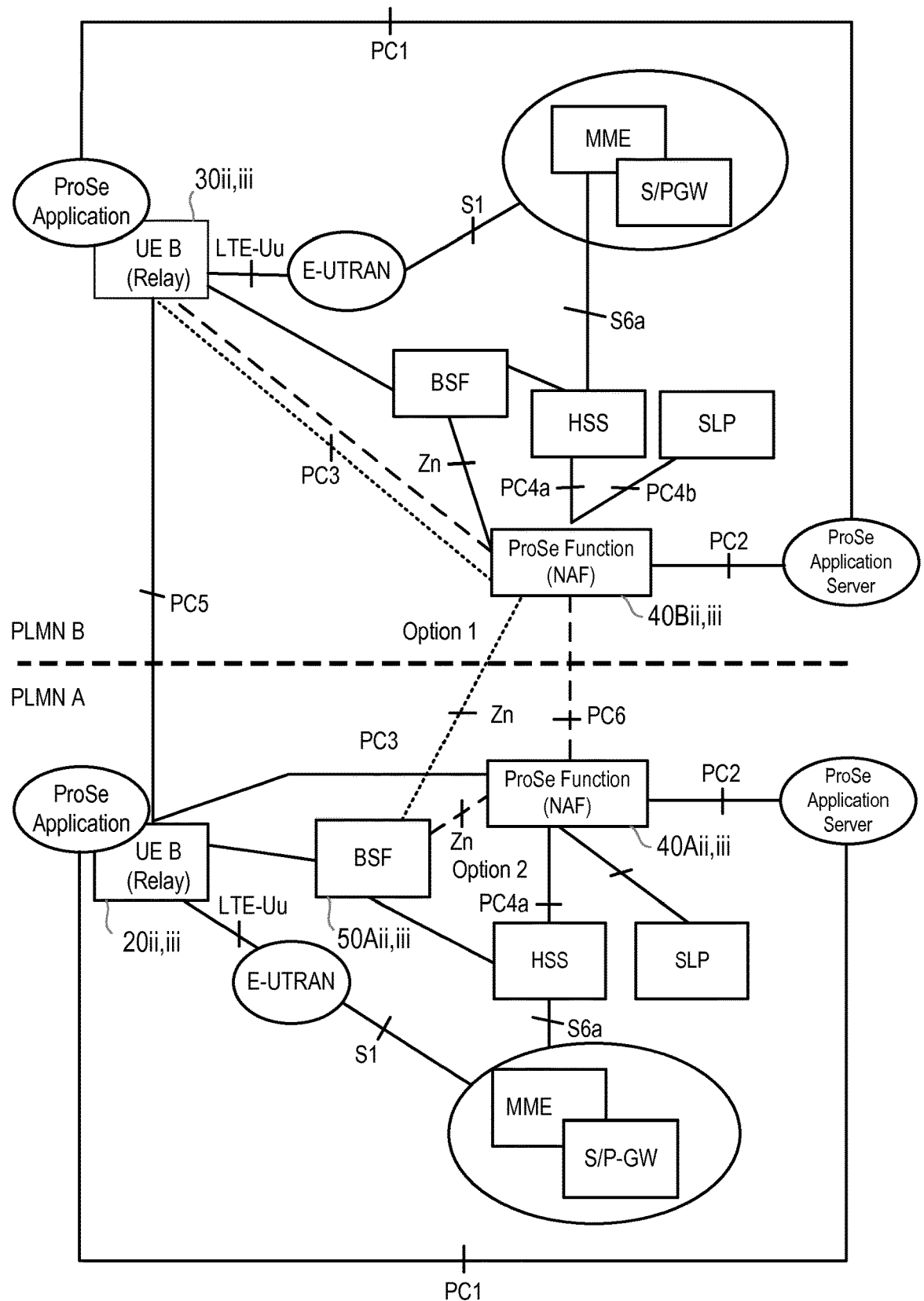
FIG. 11 is a representation of another example architecture for conducting the methods of FIGS. 4 to 6 over ProSe, wherein the UE and the device are comprised within different communication networks.

The ProSe architecture for Examples ii and iii is illustrated in FIG. 11. The PLMN of the UE 20 (UE-A or Remote UE) is designated as PLMN A, with BSF 50A and ProSe Function 40A, which acts as NAF 40A according to option 2 (Example iii). The PLMN of the device 30 (UE-B or UE-to-NW Relay) is designated as PLMN B, with ProSe Function 40B, which acts as NAF 40B according to option 1 (Example ii). According to option 1 (dotted line), the Home ProSe Function of PLMN B, which acts as NAF 40B is the DCE conducting the steps of method 3. According to option 2 (dashed line), the DCE comprises two sub-Elements: the Home ProSe Function 40A of PLMN A, which acts as NAF 40A, and the Home ProSe Function 40B of PLMN B, which acts as a relay, derives the UE delivery key and generates the direct communication key. The BSF of PLMN B is not involved in the following examples, as the initial bootstrapping performed by the UE 20 is performed with the BSF of its Home PLMN, BSF 50A.

Example ii) UE and Device in Different HPLMNs and ProSe Function of the Device Acts as NAF This example is very similar to Example i described above. The procedure for Example ii is the same as that described with reference to FIG. 10 for Example i with the following differences (equivalent step numbering is used to that of Example i, with the suffix ii applied to refer to steps conducted according to Example ii).

In step 216ii, UE-B (UE-to-Network Relay) 30ii contacts its Home ProSe Function, which is acting as the NAF 40Bii. In contrast to Example i, this is not also the Home ProSe Function of UE-A (Remote UE) 20ii, as UE-A (Remote UE) 20ii and UE-B (UE-to-Network Relay) 30ii are comprised within different PLMNs. The NAF 40Bii then contacts the BSF 50Aii of the Home PLMN of UE-A (Remote UE) 20ii in order to obtain Ks_NAF. This contact may be direct, or the NAF 40Bii may contact the BSF 50Aii using the ProSe Function 40Aii as a proxy or relay to convey messages.

Example iii) UE and Device in Different HPLMNs and ProSe Function of the UE Acts as NAF This example is also similar to Example i described above, with the exception that the ProSe Functions of two PLMNs are involved. The Prose Function of the UE acts as the NAF for GBA and the ProSe Function of the device acts as a proxy conveying messages and also contributing to the authorisation process.

Figure 12:
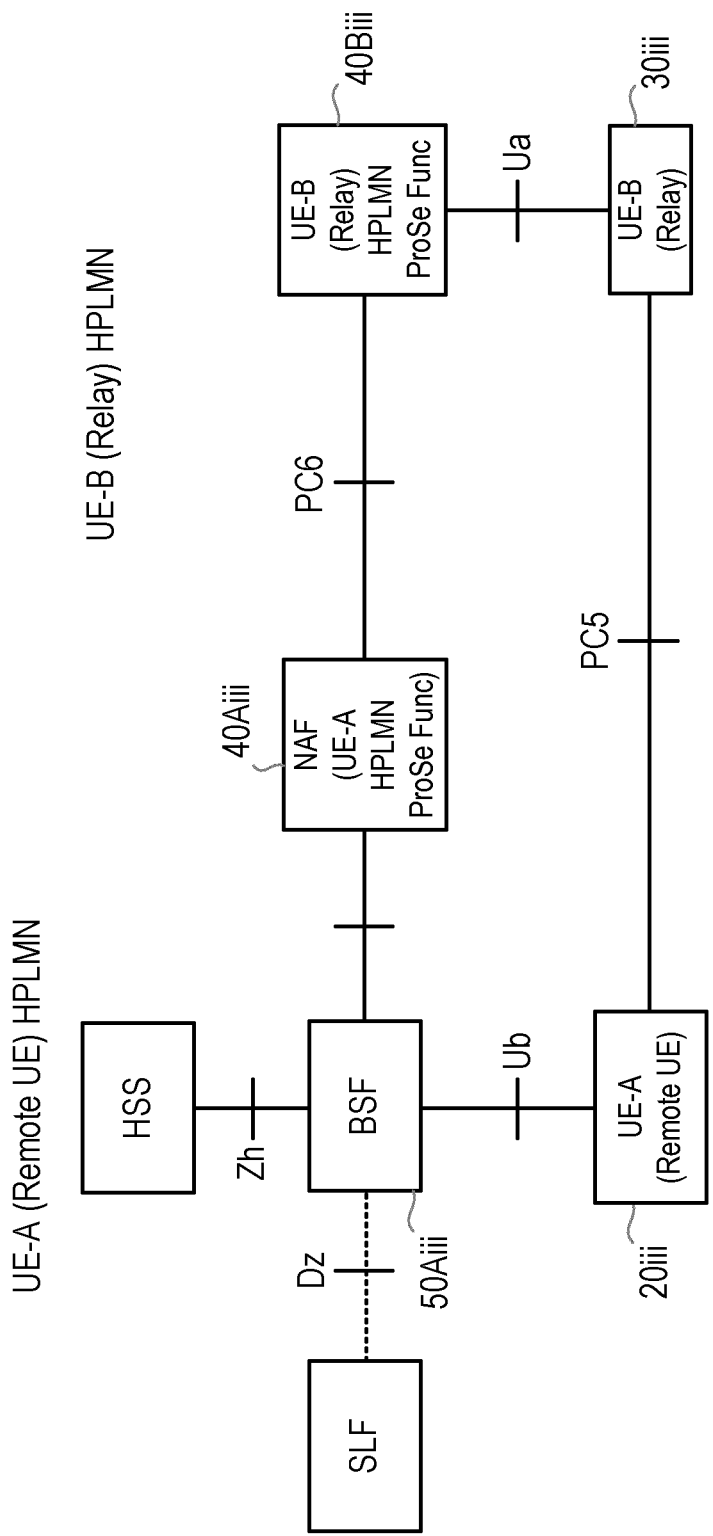
FIG. 12 is a representation of another example architecture for conducting the methods of FIGS. 4 to 6, wherein the UE and the device are comprised within different communication networks.

The GBA architecture for this example is illustrated in FIG. 12. According to this example, the UE, referred to as UE-A (Remote UE) 20iii, and the device, referred to as UE-B (UE-to-NW Relay) 30iii, are again served by E-UTRAN but by different HPLMNs. UE-A (Remote UE) 20iii is served by a different Home 3GPP operator to UE-B (UE-to-NW Relay) 30iii.

UE-A (Remote UE) 20iii initiates GBA bootstrapping with the BSF 50Aiii in its HPLMN A according to TS 33.220. UE-A (Remote UE) 20ii retrieves a B-TID from the BSF 50Aiii. Initial bootstrapping takes place with UE-A (Remote UE) 20iii in E-UTRAN coverage but subsequent steps may take place with UE-A (Remote UE) 20iii out of E-UTRAN coverage, for example if UE-B 30iii is acting as a relay or is in fact a UE-to-NW relay 30iii.

UE-B (UE-to-NW Relay) 30iii is using ProSe Direct Discovery procedures to allow UEs in the vicinity to discover it. UE-A (Remote UE) 20iii then discovers UE-B (UE-to-NW Relay) 30iii using ProSe Direct Discovery procedures on PC5 interface, for example having moved into the cell in which UE-B (UE-to-NW Relay) 30iii is located. In the present example, UE-A (Remote UE) 20iii then derives a shared session key Ks_NAF from its initial bootstrapping procedures and then derives a UE delivery key K_UE2NW from Ks_NAF and the UE-B (UE-to-NW Relay) 30iii identity. This identity is obtained during the discovery procedure.

UE-A (Remote UE) 20iii then contacts UE-B (UE-to-NW Relay) via the PC5 interface indicating the B-TID and an identity of the DCE 40Aiii, which in this case is the Home ProSe Function of PLMN A, which is acting as a NAF for the purposes of GBA. UE-A (Remote UE) 20iii requests UE-B (UE-to-NW Relay) 30iii to contact the NAF 40Aiii to request the NAF 40Aiii to provide a key for direct communication. UE-A (Remote UE) may also provide its identity, for example if this has not already been provided via discovery.

In this Example, the DCE comprises two sub-Elements, the ProSe Function in PLMN A 40Aiii, which is acting as the NAF for GBA bootstrapping, and the ProSe Function in PLMN B 40Biii, which acts as a relay, derives the UE delivery key and generates the direct communication key. UE-B (UE-to-Network Relay) 30iii thus contacts the ProSe Function of its Home PLMN 40Biii with the B-TID and UE-B (UE-to-NW Relay) 30iii identity. The Home ProSe Function 40Biii then contacts via interface PC6 the NAF 40Aiii identified by UE-A (Remote UE) 20iii, requesting the session shared key Ks_NAF identified by the B-TID. If the NAF 40Aiii does not have the Ks_NAF key identified by the B-TID already, then the NAF 40Aiii contacts the BSF 50Aiii with the B-TID and retrieves the corresponding Ks_NAF key. The NAF 40Aiii returns Ks_NAF to the Home ProSe Function 40Biii of UE-B (UE-to-Network Relay) 30iii. The Home ProSe Function 40Biii of UE-B (UE-to-Network Relay) 30iii derives the UE delivery key K_UE2NW from the Ks_NAF and UE-B (UE-to-NW Relay) 30iii identity. The Home ProSe Function 40Biii of UE-B (UE-to-Network Relay) 30iii then generates the requested direct communication key K_DC for use in direct communication between UE-A (Remote UE) 20iii and UE-B (UE-to-Network Relay) 30iii. The Home ProSe Function 40Biii of UE-B (UE-to-Network Relay) 30iii protects the direct communication key K_DC with the UE delivery key and provides the direct communication key and the protected direct communication key to UE-B (UE-to-NW Relay) 30iii over a secure link.

UE-B (UE-to-NW Relay) 30iii stores the direct communication key and sends the protected direct communication key to UE-A (Remote UE) 20iii. UE-A (Remote UE) then unprotects the direct communication key using the UE delivery key K_UE2NW, which it derived earlier. The direct communication key K_DC is then available in UE-A (Remote UE) 20iii and UE-B (UE-to-Network Relay) for direct communication between UE-A (Remote UE) 20iii and UE-B (UE-t-Network Relay) 30iii on the PC5 interface.

The above steps are described in greater detail below with reference to the messaging flow diagram in FIG. 13.

In step 102iii (message exchanges 1 to 4) UE-A (Remote UE) 20iii is served by E-UTRAN and initiates a GBA bootstrapping with its BSF 50Aiii according to TS 33.220. When the GBA bootstrapping procedure has taken place successfully then the UE-A (Remote UE) 20iii and the BSF 50Aiii have established a UE shared key Ks, a B-TID and a key lifetime of the Ks.

Following step 102iii, UE-A (Remote UE) 20iii may move outside of E-UTRAN coverage. In message exchange 5, UE-B (UE-to-NW Relay) 30iii is served by E-UTRAN and initiates E-UTRAN Attach and requests PDN connectivity.

UE-A (Remote UE) 20iii and UE-B (UE-to-NW Relay) 30iii then discover each other through Direct Discovery procedures using Direct Discovery Model A or Direct Discovery Model B at message exchange 6. Discovery may be initiated by either UE-A (Remote UE) 20iii or UE-B (UE-to-NW Relay) 30iii. In the illustrated example, discovery is initiated by UE-B (UE-to-NW Relay) 30iii. In step 204iii, UE-B (UE-to-NW Relay) 30iii issues a discovery message, which may be a Direct Discovery broadcast according to ProSe Model A or a Direct Discovery request message according to ProSe Model B. The discovery message includes an identity of UE-B (UE-to-NW Relay) 30iii. UE-A (Remote UE) 20iii receives the discovery message at step 106iii.

In the procedure illustrated at message exchange 7, UE-A (Remote UE) 20iii derives the UE delivery key K_UE2NW for delivery of the direct communication key to UE-A (Remote UE). This process is achieved in steps 138iii and 140iii in UE-A (Remote UE) 20iii. In step 138iii, UE-A (Remote UE) calculates the shared session key Ks_NAF from Ks and a NAF ID as follows:

Ks_NAF=KDF(Ks, NAF_ID, . . . )

Where KDF is a key derivation function having as inputs at least Ks and NAF_ID. Additional inputs may be included, and processing of the inputs before inputting to the KDF may take place. As the NAF is the ProSe Function of PLMN A, which is the Home PLMN of UE-A (Remote UE) 20iii, the NAF ID is known to UE-A (Remote UE) 20iii and may not need to be obtained from UE-B (ProSe-UE-to-Network Relay) 30iii during the discovery procedure.

In step 140iii, UE-A (Remote UE) 20iii calculates the UE delivery key K_UE2NW from Ks_NAF and the UE-B ID (UE-to-NW Relay ID) as follows:

K_UE2NW=KDF(Ks_NAF, UE-B ID (UE-to-*NW* Relay ID), . . . )

Where KDF is a key derivation function having as inputs at least Ks_NAF and UE-B ID (UE-to-NW Relay ID).

Additional inputs may be included, and processing of the inputs before inputting to the KDF may take place.

In the procedure illustrated at message exchange 8, UE-A (Remote UE) 20iii requests UE-B (UE-to-NW Relay) 30iii to contact the NAF 40Aiii in order to request the NAF 40Aiii to provide the direct communication key, to be used for direct communication on the PC5 interface. The direct communication key is to be protected with the UE delivery key, derived from a Ks_NAF identified by a B-TID sent by UE-A (Remote UE).

In step 108iii, UE-A (Remote UE) 20ii sends the request to UE-B (UE-to-NW Relay) 30iii on the PC5 interface. In the illustrated example, the request is sent as part of a Direct Discovery response message according to Model B of ProSe Direct Discovery. The Direct Discovery response message contains the B-TID and the NAF_ID and may also contain the UE-A (Remote UE) 20iii identity. In alternative examples, such as where Direct Discovery according to Model A is used, the request sent at step 108iii may simply be a request message sent on the PC5 interface in response to a discovery broadcast from UE-B (UE-to-NW Relay) 30iii. In some examples, the request message may be integrity protected with a MAC which may be generated using a ProSe key used for direct discovery.

In message exchange 9, UE-B (ProSe UE-to-Network Relay) 30iii contacts its own home ProSe Function 40Biii over the interface PC3 by initiating the establishment of a secure link with the ProSe Function 40Biii. This may comprise initiating, for example, a TLS tunnel using pre-shared certificates or with GBA.

In message exchange 10, UE-B (ProSe UE-to-Network Relay) 30iii requests its Home ProSe Function 40Biii to provide the direct communication key. UE-B (ProSe UE-to-Network Relay) 30iii sends the message at step 212iii, including the B-TID received from UE-A (Remote UE) 20iii and the UE-B identity (UE-to-NW Relay identity). The message may also contain the UE-A (Remote UE) 20iii identity. This message is received by the Home ProSe Function 40Biii at step 314iii. In step 316 (message exchange 11), the Home ProSe Function 40Biii authorizes the UE-B identity (UE-to-NW Relay identity) by checking a database with a list of authorized identities. This database may be local and supported by the Home ProSe Function 40Biii or may be implemented in a different network server.

If the UE-B identity (UE-to-NW Relay identity) is configured in the database, then the UE-B (UE-to-NW Relay) 30iii is authorized to request the key corresponding to the B-TID. The Home ProSe Function 40Biii therefore requests the session shared key Ks_NAF in step 318iii and receives the requested key in step 320iii. This is achieved by first contacting the NAF 40Aiii over the PC6 interface, requesting the key corresponding to the B-TID. The NAF 40Aiii may authorize the UE-A (Remote UE) 20iii identity and then contacts the BSF 50Aiii to request the session shared key Ks_NAF, as described in TS 33.220. The NAF receives Ks_NAF from the BSF 50Aiii and sends the session shared key Ks_NAF to the Home ProSe Function 40Biii of UE-B (UE-to-NW Relay) 30iii.

In message exchange 12, the Home ProSe Function 40Biii of UE-B (UE-to-NW Relay) 30iii generates and protects the direct communication key. This is achieved via steps 322iii, 324iii and 326iii. In step 322iii, the Home ProSe Function 40Biii of UE-B (UE-to-NW Relay) 30iii calculates the UE delivery key K_UE2NW from Ks_NAF and UE-B ID (ProSe UE-to-Network Relay ID) as follows:

K_UE2NW=KDF(Ks_NAF, UE-B ID (UE-to-NW Relay ID), . . . )

The Home ProSe Function 40Biii of UE-B (UE-to-NW Relay) 30iii thus generates the same UE delivery key as UE-A (Remote UE), using the same derivation procedure. As discussed above, KDF is a key derivation function having as inputs at least Ks_NAF and UE-B ID (UE-to-NW Relay ID). Additional inputs may be included, and processing of the inputs before inputting to the KDF may take place.

Figure 13:
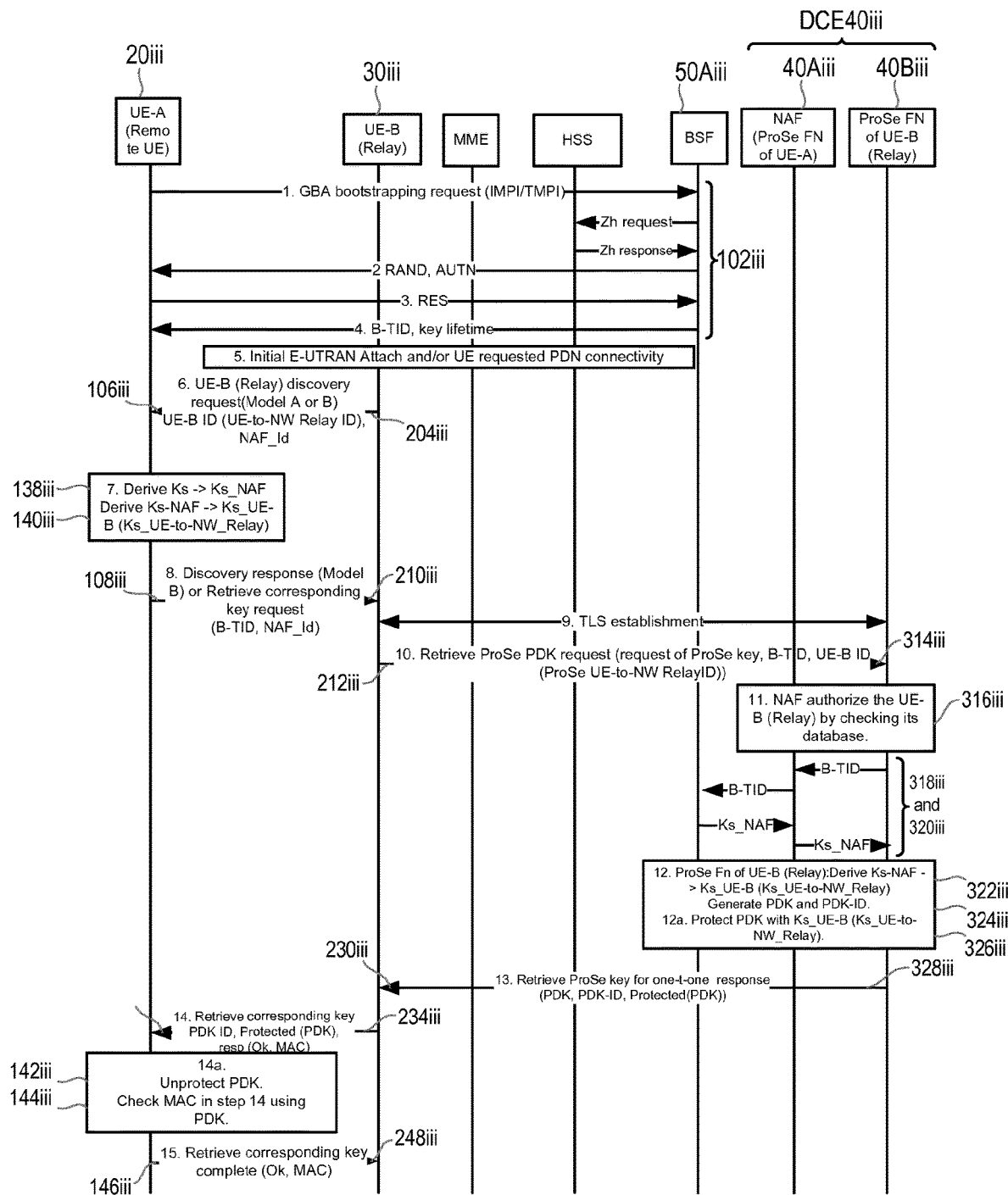
FIG. 13 is a message flow illustrating an example implementation of the methods of FIGS. 4 to 6 over ProSe.

In step 324iii, the Home ProSe Function 40Biii of UE-B (UE-to-NW Relay) 30iii generates the direct communication key K_DC (labelled as the ProSe Direct Communication Key (PDK) in FIG. 13). The direct communication key K_DC is generated using a random number generator. The Home ProSe Function 40Biii of UE-B (UE-to-NW Relay) 30iii also generates a direct communication key identifier K_DC ID and may generate a direct communication key lifetime. In step 326iii, the Home ProSe Function 40Biii of UE-B (UE-to-NW Relay) 30iii protects the generated direct communication key K_DC using the derived UE delivery key K_UE2NW. Protecting includes encrypting K_DC with the UE delivery key K_UE2NW and may also include protecting the integrity of K_DC with the UE delivery key.

In message exchange 13, the Home ProSe Function 40Biii of UE-B (UE-to-NW Relay) 30iii sends or provisions direct communication key K_DC, the protected direct communication key protected(K_DC) and the K_DC identity and lifetime to UE-B (UE-to-NW Relay) 30iii. The Home ProSe Function 40Biii of UE-B (UE-to-NW Relay) sends a message containing the keys in step 328iii, which message is received by UE-B (UE-to-NW Relay) 30iii in step 230iii.

UE-B (UE-to-Network Relay) 30iii stores the direct communication key and the direct communication key identifier. It then generates a MAC using the direct communication key at step 232iii and sends the protected direct communication key, the direct communication key identity and lifetime and its own identity, with the generated MAC, to UE-A (Remote UE) in a message sent at step 234iii (message exchange 14). This message is received by UE-A (Remote UE) at step 136iii.

In message exchange 14a, UE-A (Remote UE) 20iii accesses the direct communication key and checks the MAC. This is achieved via steps 142iii and 144iii. In step 142iii, UE-A (Remote UE) unprotects the protected direct communication key using the UE delivery key which it derived at step 140iii. This may comprise decrypting the direct communication key and verifying its integrity. In step 144iii, UE-A (Remote UE) 20iii checks the MAC received from UE-B (UE-to-NW Relay) 30iii in step 136iii. The MAC is checked using the direct communication key used to generate the MAC, and which UE-A (Remote UE) has just unprotected. If the check is successful, then UE-A (Remote UE) 20iii knows that UE-B (UE-to-NW Relay) 30iii shares the same direct communication key K_DC as UE-A (Remote UE) 20iii. UE-A (Remote UE) 20iii can now use the direct communication key K_DC for direct communication on the PC5 interface with UE-B (UE-to-NW Relay) 30iii.

In message exchange 15, UE-A (Remote UE) 20iii confirms to UE-B (UE-to-NW Relay) 30iii, that the check of the MAC was successful and that ProSe Direct Communication on PC5 interface between UE-A (Remote UE) 20iii and UE-B (UE-to-NW Relay) 30iii can now take place using the direct communication key. UE-A (Remote UE) 20iii protects the confirmation with a MAC using the direct communication key. The confirmation message is sent by UE-A (Remote UE) 20iii in step 146iii and received at UE-B (UE-to-NW Relay) 30iii in step 148iii.

In an alternative example, not shown, the Home ProSe Function 40Aiii of UE-A (remote UE) 20*iii* may both act as NAF and derive the UE delivery key and generate the direct discovery key. In such an example, the Home ProSe Function 40Biii of UE-B (UE-to-Network Relay) 30*iii* may act simply to relay messages between UE-B (UE-to-Network Relay) 30*iii* and the NAF 40Aiii.

As in the previous examples, mutual authentication may be included in the methods illustrated by Example iii. UE-A (Remote UE) 20*iii* and UE-B (UE-to-NW Relay) 30*iii* may generate nonces for mutual authentication: UE-A (Remote UE) 20*iii* generates nonce-UE-A and UE-B (UE-to-NW Relay) 30*iii* generates nonce-UE-B. A nonce may for example be a sequence number, a random value or a timestamp. Nonces may be exchanged in various messages of the above described example procedure. In one example, UE-A (Remote UE) 20*iii* sends nonce-UE-A to UE-B (UE-to-NW Relay) 30*iii* with the request to obtain a direct communication key sent in step 108*iii* (message exchange 8). UE-B (UE-to-NW Relay) 30*iii* takes nonce-UE-A as an input to its calculation of a MAC at step 232*iii*, which MAC is sent to UE-A (Remote UE) 20*iii* in step 234*iii*. When UE-A (Remote UE) 20*iii* verifies the MAC, this in practice means that UE-A (Remote UE) 20*iii* authenticates UE-B (UE-to-NW Relay). An equivalent process allows authentication in the other direction. UE-B (UE-to-NW Relay) 30*iii* sends nonce-UE-B to UE-A (Remote UE) 20*iii* in step 234*iii* (message exchange 14). UE-A (Remote UE) uses nonce-UE-B as an input to its MAC calculation, which MAC is sent to the UE-B (UE-to-NW Relay) in step 146*iii* (message exchange 15). When UE-B (UE-to-NW Relay) 30*iii* verifies the MAC, this in practice means that UE-B (UE-to-NW Relay) authenticates UE-A (Remote UE) 20*iii*.

Figure 14:
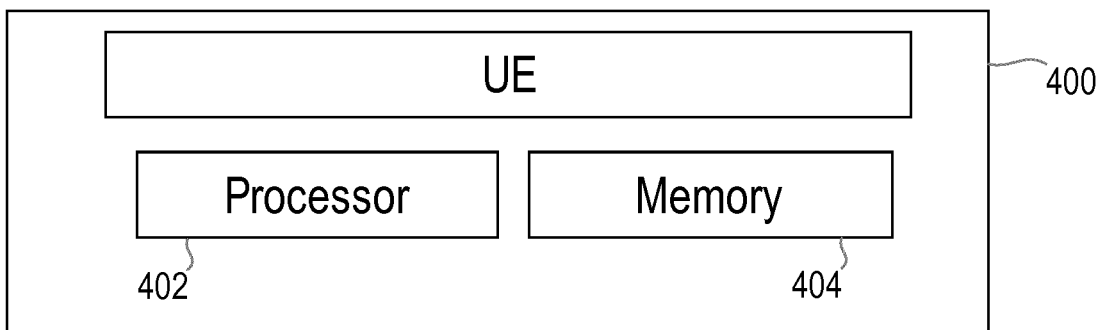
FIG. 14 is a block diagram illustrating a UE.
Figure 15:
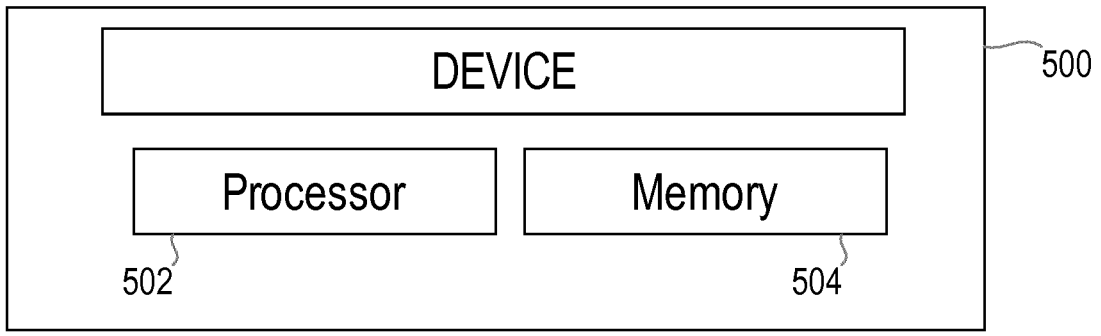
FIG. 15 is a block diagram illustrating a device.
Figure 16:
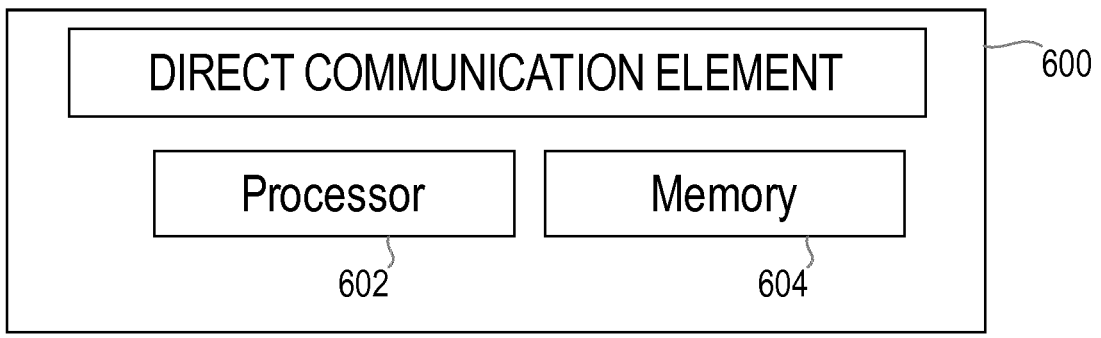
FIG. 16 is a block diagram illustrating a Direct Communication Element.
Figure 17:
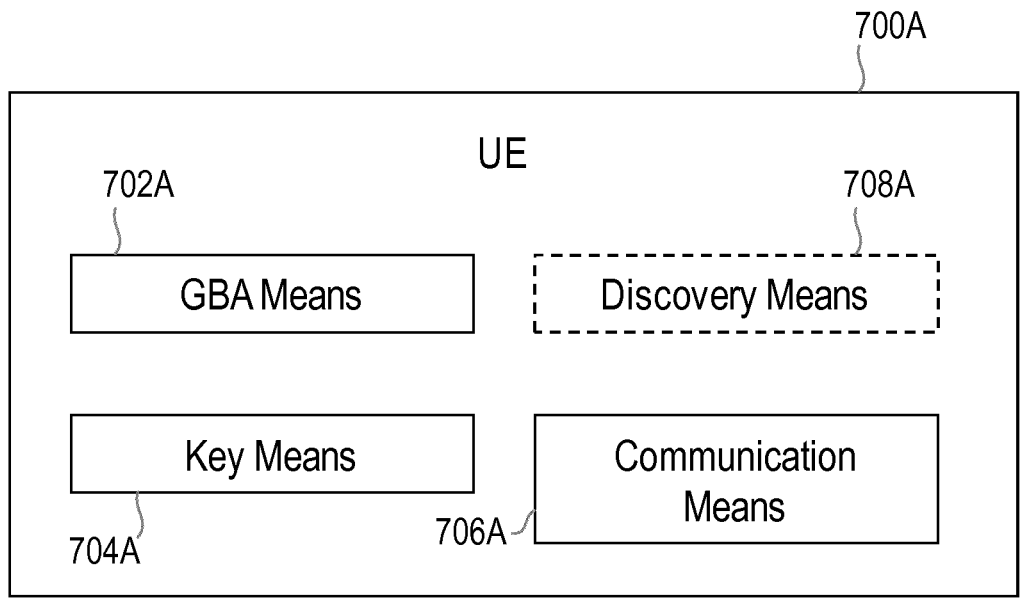
FIG. 17 is a block diagram illustrating another example of a UE.
Figure 18:
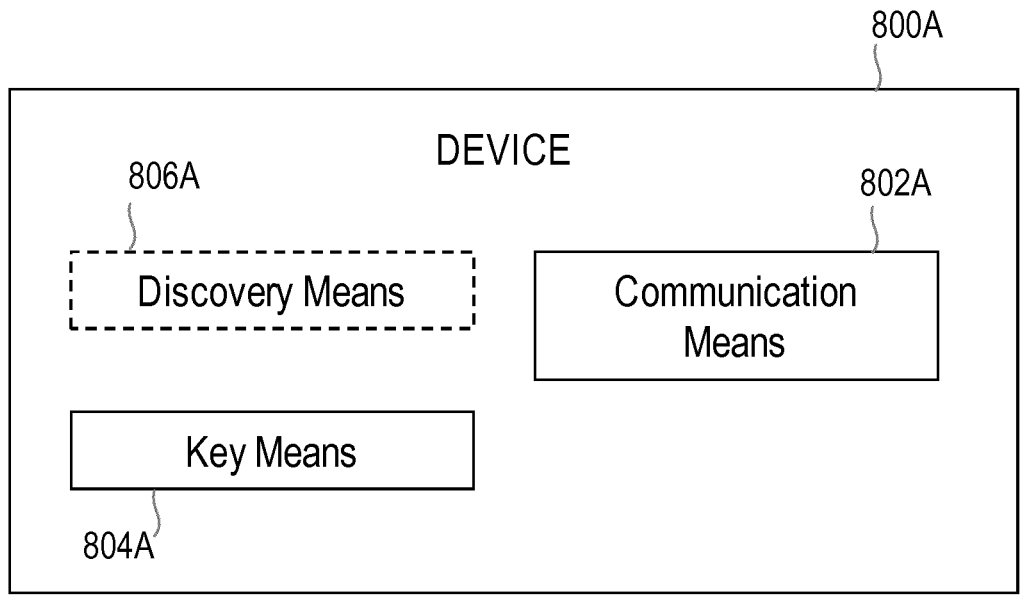
FIG. 18 is a block diagram illustrating another example of a device.

The methods of the present invention, as illustrated by the above examples, may be conducted in a UE, a device which may be a UE, a UE-to-Network Relay, or a network node, or a Direct Communication Element (DCE) such as a ProSe Function or a KMS. The methods may be conducted on receipt of suitable computer readable instructions, which may be embodied within a computer program running on the UE, device or DCE. FIGS. 14 to 16 illustrate first examples of a UE, device and DCE which may execute the methods of the present invention, for example on receipt of suitable instructions from a computer program. Referring to FIGS. 16 to 18, each of the UE 400, device 500 and DCE 600 comprises a processor 402, 502, 602 and a memory 404, 504, 604. The memory 404, 504, 604 contains instructions executable by the processor 402, 502, 602 such that the UE 400 is operative to carry out the method 100, the device 500 is operative to carry out the method 200 and the DCE 600 is operative to carry out the method 300.

FIG. 17 illustrates functional units in another embodiment of UE 700A which may execute the method 100, for example according to computer readable instructions received from a computer program. It will be understood that the units illustrated in FIG. 17 are software implemented functional units, and may be realised in any appropriate combination of software modules.

Referring to FIG. 17, the UE 700A comprises GBA means 702A for establishing a UE shared key with a BSF using a GBA procedure and for receiving from the BSF a transaction identifier associated with the UE shared key. The UE 700A also comprises communication means 706A for sending the transaction identifier and a Direct Communication Element identifier to the device and for requesting the device to obtain a direct communication key. The communication means 706A also comprise means for receiving from the device the direct communication key encrypted with a UE delivery key. The UE 700A also comprises key means 704A for deriving a session shared key from at least the UE shared key and a Direct Communication Element identifier, and for deriving the UE delivery key from at least the session shared key and an identifier of the device. The key means 704A also comprise means for decrypting the direct communication key using the derived UE delivery key The UE 700A may also comprise discovery means 708A for discovering a device through a discovery procedure after receipt of the transaction identifier. The communication means 706A may also comprise means for receiving a discovery message from the device and for passing the message to the discovery means 708A, wherein the discovery message includes the identifier of the device.

The communication means 706A may further comprise means for sending the transaction identifier and the Direct Communication Element identifier to the device, and for requesting the device to obtain the direct communication key by sending a discovery response message responding to the received discovery message and assembled by the discovery means 708A.

The communication means 706a may further comprise means for receiving a MAC with the direct communication key encrypted with the UE delivery key, wherein the MAC is generated using the direct communication key. The key means 704A may further comprise means for checking the MAC using the direct communication key, and, if the check is successful, the communication means 706A may comprise means for sending a second confirmation message to the device.

In one example, the GBA means 702A, key means 704A, communication means 706A and discovery means 708A may be implemented with help from a computer program which, when run on a processor, causes the GBA means 702A, key means 704A, communication means 706A and discovery means 708A to cooperate to carry out examples of the method 100 as described above.

FIG. 18 illustrates functional units in another embodiment of device 800A which may execute the method 200 of the present invention, for example according to computer readable instructions received from a computer program. It will be understood that the units illustrated in FIG. 18 are software implemented functional units, and may be realised in any appropriate combination of software modules.

Referring to FIG. 18, the device 800A comprises communication means 802A for receiving from the UE a transaction identifier, a Direct Communication Element identifier and a request to obtain a direct communication key, and for sending to the Direct Communication Element identified by the Direct Communication Element identifier the transaction identifier and an identifier of the device, and for requesting the Direct Communication Element to provide the device with the direct communication key. The device communication means 802A also comprises means for receiving the direct communication key and the direct communication key encrypted with a UE delivery key from the Direct Communication Element and for sending the encrypted direct communication key to the UE. The device 800A also comprises key means 804A for storing the direct communication key.

The device 800A may also comprise discovery means 806A for discovering the UE through a discovery procedure. The communication means 804A may further comprise means for sending a discovery message to the UE, wherein the discovery message includes the identifier of the device and is assembled by the discovery means 806A. The discovery message may further include the Direct Communication Element identifier.

The key means 804A may further comprise means for generating a MAC using the direct communication key received from the Direct Communication Element. The communication means 802A may further comprise means for sending the MAC with encrypted direct communication key to the UE.

The device 800A may be at least one of a UE or a network node such as a UE-to-Network Relay. In some examples, the communication means 802A, key means 804A and discovery means 806A may be implemented with help from a computer program which, when run on a processor, causes the communication means 802A, key means 804A and discovery means 806A to cooperate to carry out examples of the method 200 as described above.

Figure 19:
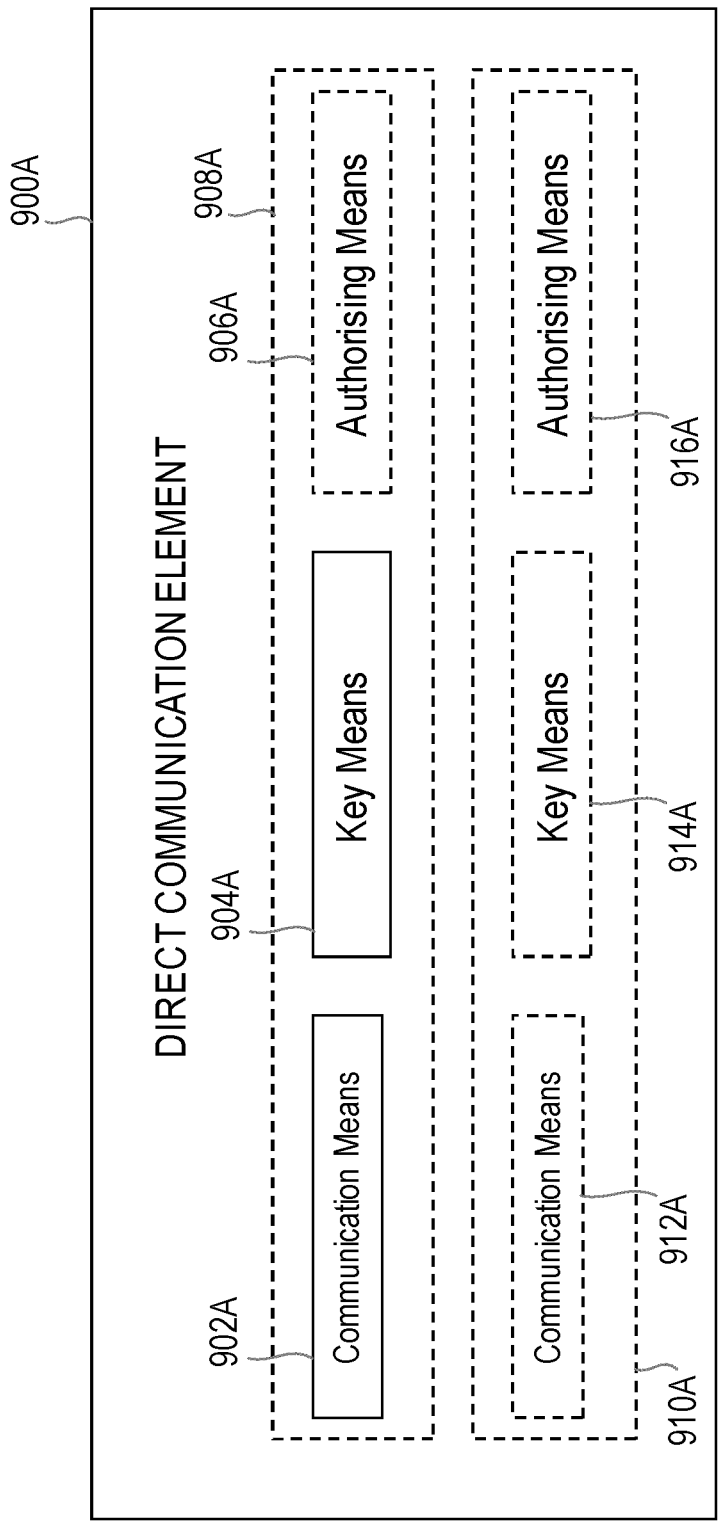
FIG. 19 is a block diagram illustrating another example of a Direct Communication Element.

FIG. 19 illustrates functional units in another embodiment of DCE 900A which may execute the method 300 of the present invention, for example according to computer readable instructions received from a computer program. It will be understood that the units illustrated in FIG. 19 are software implemented functional units, and may be realised in any appropriate combination of software modules.

Referring to FIG. 19, the DCE 900A comprises communication means 902A for receiving from a device a transaction identifier, a device identifier and a request to provide a direct communication key to the device, for sending the transaction identifier to a BSF corresponding to the transaction identifier and for receiving a session shared key from the BSF. The DCE 900A further comprises Key means 904A for deriving a UE delivery key from the session shared key and at least the device identifier, for generating a direct communication key for direct communication between the UE and the device and for encrypting the direct communication key with the UE delivery key. The communication means 902A further comprise means for sending the direct communication key and the encrypted direct communication key to the device.

The DCE 900A may comprise at least one of a ProSe Function or a ProSe KMS.

The DCE 900A may further comprise authorising means 906A for checking that the device is authorised to establish direct communication with the UE and/or that the UE is authorised to establish direct communication with the device.

The DCE 900A may comprise a first sub-Element 908A in a first communication network and a second sub-Element 910A in a second communication network. The first and second sub elements may each comprise communication means 902A, 912A, key means 904A, 914A and authorising means 906A, 916A.

The communication means 902A or 912A in one of the first or second sub-Elements 908A, 910A may comprise means for sending to and receiving from at least one of the BSF or the device by sending to and receiving from the communication unit 902A or 912A in the other of the first or second sub-Elements 908A, 910A.

In some examples, the communication means 902A, 912A, key means 904A, 914A and authorising means 906A, 916A may be implemented with help from a computer program which, when run on a processor, causes the communication means 902A, 912A, key means 904A, 914A and authorising means 906A, 916A to cooperate to carry out examples of the method 300 as described above.

Figure 20:
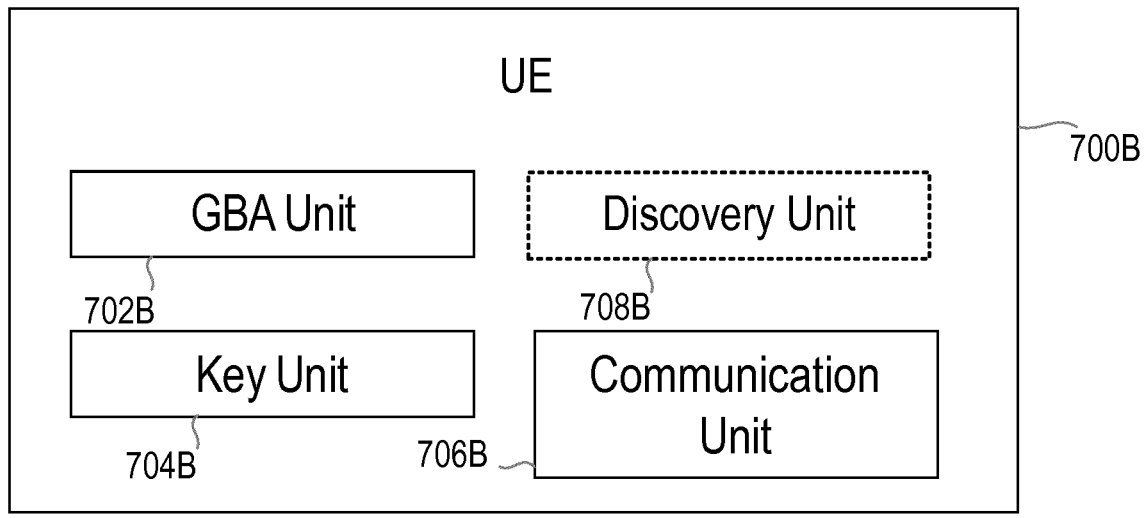
FIG. 20 is a block diagram illustrating another example of a UE.

FIG. 20 illustrates functional units in another embodiment of UE 700B which may execute the method 100, for example according to computer readable instructions received from a computer program. It will be understood that the units illustrated in FIG. 20 are hardware functional units, and may be realised in any appropriate combination of hardware elements.

Referring to FIG. 20, the UE 700B comprises a GBA unit 702B configured to establish a UE shared key with a BSF using a GBA procedure and to receive from the BSF a transaction identifier associated with the UE shared key. The UE 700B also comprises a communication unit 706B configured to send the transaction identifier and a Direct Communication Element identifier to the device and to request the device to obtain the direct communication key. The communication unit 706B is also configured to receive from the device the direct communication key encrypted with the UE delivery key The UE 700B also comprises a key unit 704B configured to derive a session shared key from at least the UE shared key and the Direct Communication Element identifier and to derive the UE delivery key from at least the session shared key and an identifier of the device. The key unit 704B is also configured to decrypt the direct communication key using the derived UE delivery key.

The UE 700B may also comprise discovery unit 708B configured to discover the device through a discovery procedure.

The communication unit 708B may be configured to receive a discovery message from the device and to pass the message to the discovery unit 704B, wherein the discovery message includes the identifier of the device.

The communication unit 704B may further be configured to send the transaction identifier and the Direct Communication Element identifier to the device, and to request the device to obtain the direct communication key by sending a discovery response message responding to the received discovery message and assembled by the discovery unit 704B.

The communication unit 706B may be configured to receive a MAC with the direct communication key encrypted with the UE delivery key, wherein the MAC is generated using the direct communication key. The key unit 704B may be configured to check the MAC using the decrypted direct communication key, and, if the check is successful, the communication unit 708 may be configured to send a confirmation message to the device.

Figure 21:
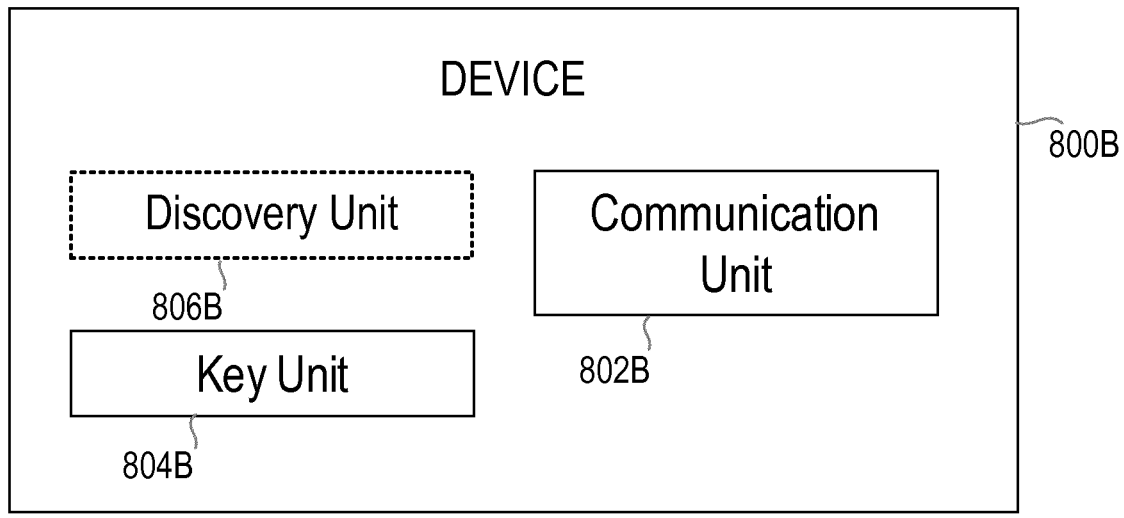
FIG. 21 is a block diagram illustrating another example of a device.

FIG. 21 illustrates functional units in another embodiment of device 800B which may execute the method 200 of the present invention, for example according to computer readable instructions received from a computer program. It will be understood that the units illustrated in FIG. 21 are hardware implemented functional units, and may be realised in any appropriate combination of hardware elements.

Referring to FIG. 21, the device 800B comprises a communication unit 802B configured to receive from the UE a transaction identifier, a Direct Communication Element identifier and a request to obtain a direct communication key, and to send to the Direct Communication Element identified by the Direct Communication Element identifier the transaction identifier and an identifier of the device, and to request the Direct Communication Element to provide the device with the direct communication key. The communication unit 802B is also configured to receive the direct communication key and the direct communication key encrypted with a UE delivery key from the Direct Communication Element and to send the encrypted direct communication key to the UE. The device 800B further comprises a key unit 804B for storing the direct communication key.

The device 800B may further comprise a discovery unit 806B configured to discover the UE through a discovery procedure.

The communication unit 802B may be further configured to send a discovery message to the UE, wherein the discovery message includes the identifier of the device and is assembled by the discovery unit 802B. The discovery message may further include the Direct Communication Element identifier.

The key unit 804B may be configured to generate a MAC using the direct communication key received from the Direct Communication Element. The communication unit 802B may be configured to send the MAC with the encrypted direct communication key.

The device 800B may be at least one of a UE or a network node such as a UE-to-Network Relay.

Figure 22:
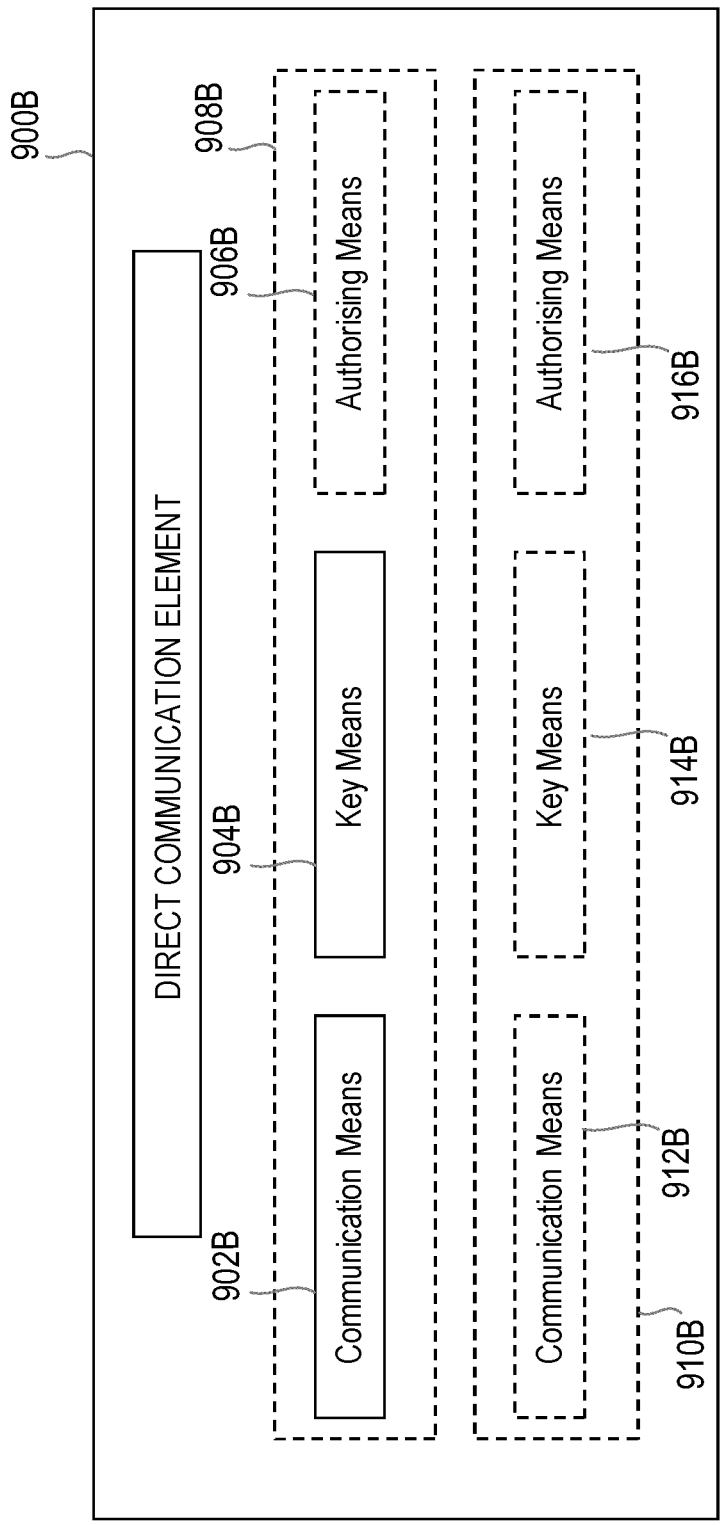
FIG. 22 is a block diagram illustrating another example of a Direct Communication Element.

FIG. 22 illustrates functional units in another embodiment of DCE 900B which may execute the method 300 of the present invention, for example according to computer readable instructions received from a computer program. It will be understood that the units illustrated in FIG. 22 are hardware implemented functional units, and may be realised in any appropriate combination of hardware elements.

Referring to FIG. 22, the DCE 900B comprises a communication unit 902B configured to receive from a device a transaction identifier, a device identifier and a request to provide a direct communication key to the device, to send the transaction identifier to a BSF corresponding to the transaction identifier and to receive a session shared key from the BSF. The DCE 900B further comprises a Key unit 904B configured to derive a UE delivery key from the session shared key and at least the device identifier, to generate a direct communication key for direct communication between the UE and the device and to encrypt the direct communication key with the UE delivery key. The communication unit 902B is further configured to send the direct communication key and the encrypted direct communication key to the device.

The DCE 900B may comprise at least one of a ProSe Function or a ProSe KMS.

The DCE 900B may further comprise an authorising unit 906B configured to check that the device is authorised to establish direct communication with the UE and/or that the UE is authorised to establish direct communication with the device.

The DCE 900B may comprise a first sub-Element 908B in a first communication network and a second sub-Element 910B in a second communication network. The first and second sub elements may each comprise a communication unit 902B, 912B, a key unit 904B, 914B and an authorising unit 906B, 916B.

The communication unit 902B or 912B in one of the first or second sub-Elements 908B, 910B may be configured to send to and receive from at least one of the BSF or the device by sending to and receiving from the communication unit 902B or 912B in the other of the first or second sub-Elements 908B, 910B.

Aspects of the present invention thus provide methods, apparatus, computer programs and a system enabling the establishment of a key for direct communication between a UE and a device. The key is established without requiring pre-configuration in the UE and device. The key is generated by a Direct Communication Element such as a ProSe Function or ProSe KMS. The key is delivered to the UE in a protected form, protected by a delivery key that is unique both to the UE and the device. The delivery key is derived independently by the UE and by the DCE on the basis of initial GBA bootstrapping performed by the UE. The delivery key ensures that only the intended UE can access the key for direct communication and direct communication between the UE and the device is therefore secure. Additionally, the direct communication key is delivered using a protection involving initial GBA bootstrapping procedures and yet the UE retains the flexibility to move outside of network coverage before discovering the device with which the shared key will be used and without requiring any additional bootstrapping procedure to be conducted by the other device.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, performed by a user equipment (UE) for obtaining a key for direct communication with a device over an interface, the method comprising:
    establishing a UE shared key with a Bootstrapping Server Function (BSF) using a Generic Bootstrapping Architecture (GBA) procedure, and receiving, from the BSF, a transaction identifier associated with the UE shared key;
    sending the transaction identifier and a Direct Communication Element identifier to the device and requesting the device to obtain a direct communication key, wherein the interface comprises a Proximity Services (ProSe) interface, and wherein a Direct Communication Element comprises at least one of a ProSe Function or a ProSe Key Management Server (KMS);
    receiving, from the device, the direct communication key encrypted with a UE delivery key;
    deriving a session shared key from at least the UE shared key and the Direct Communication Element identifier;
    deriving the UE delivery key from at least the session shared key and an identifier of the device; and
    decrypting the direct communication key using the derived UE delivery key.

2. The method as claimed in claim 1, further comprising discovering the device through a discovery procedure.

3. The method as claimed in claim 1, wherein at least one of: the transaction identifier, the Direct Communication Element identifier, or the request to obtain the direct communication key is comprised within a discovery procedure message.

4. The method as claimed in claim 1, further comprising receiving a discovery message from the device, wherein the discovery message includes the identifier of the device.

5. The method as claimed in claim 4, wherein the discovery message further includes the Direct Communication Element identifier.

6. The method as claimed in claim 4, wherein sending the transaction identifier and the Direct Communication Element identifier to the device and requesting the device to obtain the direct communication key comprises sending a discovery response message responding to the received discovery message.

7. The method as claimed in claim 1, further comprising:
receiving a Message Authentication Code (MAC) with the direct communication key encrypted with the UE delivery key, wherein the MAC is generated using the direct communication key;
checking the MAC using the decrypted direct communication key; and
if the check is successful, sending a confirmation message to the device.

8. The method as claimed in claim 7, further comprising sending a MAC with the confirmation message, wherein the MAC for sending with the confirmation message is generated using the decrypted direct communication key.

9. The method as claimed in claim 1, wherein the device comprises at least one of:
a UE; and
a UE-to-Network Relay.

10. The method as claimed in claim 9, wherein, if the device comprises the UE-to-Network relay, the method further comprises conducting the step of establishing the UE shared key with the BSF using the GBA procedure, and receiving from the BSF the transaction identifier associated with the UE shared key, before exiting a coverage area of a communication network with which the UE is communicating.

11. The method as claimed in claim 1, wherein, if the UE is comprised within a first communication network and the device is comprised within a second communication network, the Direct Communication Element comprises a first sub-Element in the first communication network and a second sub-Element in the second communication network.

12. A computer program product comprising a non-transitory computer readable medium storing a computer program configured, when run on a computer, to carry out the method according to claim 1.

13. A user equipment (UE) configured for obtaining a key for direct communication with a device over an interface, the UE comprising a processor and a memory, the memory containing instructions executable by the processor, such that the UE is operable to carry out the method according to claim 1.

14. A method performed by a device, for obtaining a key for direct communication with a user equipment (UE) over an interface, the method comprising:
receiving, from the UE, a transaction identifier, a Direct Communication Element identifier, and a request to obtain a direct communication key;
sending, to a Direct Communication Element identified by the Direct Communication Element identifier the transaction identifier and an identifier of the device, and requesting the Direct Communication Element to provide the device with the direct communication key, wherein the interface comprises a Proximity Services (ProSe) interface, and wherein the Direct Communication Element comprises at least one of a ProSe Function or a ProSe Key Management Server (KMS);
receiving the direct communication key and the direct communication key encrypted with a UE delivery key from the Direct Communication Element, wherein the UE delivery key is derived from at least a session shared key and the identifier of the device; and
sending the encrypted direct communication key to the UE.

15. The method as claimed in claim 14, further comprising discovering the UE through a discovery procedure.

16. The method as claimed in claim 14, wherein at least one of: the transaction identifier, the Direct Communication Element identifier, or the request to obtain the direct communication key is comprised within a discovery procedure message.

17. The method as claimed in claim 14, further comprising sending a discovery message to the UE, wherein the discovery message includes the identifier of the device.

18. The method as claimed in claim 17, wherein the discovery message further includes the Direct Communication Element identifier.

19. The method as claimed in claim 17, wherein receiving, from the UE, the transaction identifier, the Direct Communication Element identifier, and the request to obtain the direct communication key comprises receiving a discovery response message responding to the sent discovery message.

20. The method as claimed in claim 14, further comprising:
generating a Message Authentication Code (MAC) using the direct communication key received from the Direct Communication Element; and
sending the MAC with the encrypted direct communication key to the UE.

21. The method as claimed in claim 14, further comprising receiving a confirmation message, from the UE, indicating that the UE has decrypted the direct communication key.

22. The method as claimed in claim 14, wherein the device comprises at least one of:
a UE; and
a UE-to-Network Relay.

23. The method as claimed in claim 14, wherein, if the UE is comprised within a first communication network and the device is comprised within a second communication network, the Direct Communication Element comprises a first sub-Element in the first communication network and a second sub-Element in the second communication network.

24. The method as claimed in claim 23, wherein, if the UE is comprised within the first communication network and the device is comprised within the second communication network, sending to and receiving from the Direct Communication Element comprises sending to and receiving from the second sub-Element comprised within the second communication network.

25. A computer program product comprising a non-transitory computer readable medium storing a computer program configured, when run on a computer, to carry out the method according to claim 14.

26. A device configured for obtaining a key for direct communication with a user equipment (UE) over an interface, the device comprising a processor and a memory, the memory containing instructions executable by the processor, such that the device is operable to carry out the method according to claim 14.

27. A method performed by a Direct Communication Element, for establishing a key for direct communication over an interface between a user equipment (UE) and a device, the method comprising:

receiving, from the device, a transaction identifier, a device identifier and a request to provide a direct communication key to the device;
sending the transaction identifier to a Bootstrapping Server Function (BSF) corresponding to the transaction identifier;
receiving a session shared key from the BSF;
deriving a UE delivery key from the session shared key and at least the device identifier;
generating a direct communication key for direct communication between the UE and the device;
encrypting the direct communication key with the UE delivery key; and
sending the direct communication key and the encrypted direct communication key to the device, wherein the interface comprises a Proximity Services (ProSe) interface, and wherein the Direct Communication Element comprises at least one of a ProSe Function or a ProSe Key Management Server (KMS).

28. The method as claimed in claim 27, further comprising checking that the device is authorised to establish the direct communication with the UE.

29. The method as claimed in claim 27, wherein, if the UE is comprised within a first communication network and the device is comprised within a second communication network, the Direct Communication Element comprises a first sub-Element in the first communication network and a second sub-Element in the second communication network.

30. The method as claimed in claim 29 wherein, if the UE is comprised within the first communication network and the device is comprised within the second communication network, sending to and receiving from at least one of the BSF or the device comprises sending to and receiving from one of the first or second sub-Elements via the other of the first or second sub-Elements.

31. The method as claimed in claim 29 wherein, if the UE is comprised within the first communication network and the device is comprised within the second communication network,
sending to and receiving from the BSF comprises sending and receiving at the first sub-Element; and
deriving the UE delivery key comprises deriving the UE delivery key at the second sub-Element.

32. The method as claimed in claim 27, wherein the device comprises at least one of:
a UE; and
a UE-to-Network Relay.

33. A Direct Communication Element configured for establishing a key for direct communication over an interface between a user equipment (UE) and a device, the Direct Communication Element comprising a processor and a memory, the memory containing instructions executable by the processor, such that the Direct Communication Element is operable to carry out the method according to claim 27.

34. A system for securing direct communication between a user equipment (UE) and a device over an interface, the system comprising a UE, a device, and a Direct Communication Element;
wherein the UE is configured to establish a UE shared key with a Bootstrapping Server Function (BSF) using a Generic Bootstrapping Architecture (GBA) procedure; to receive an encrypted direct communication key from the device; to derive a UE delivery key from at least a session shared key and an identifier of the device, wherein the session shared key is derived from at least the UE shared key; and to decrypt the encrypted direct communication key using the UE delivery key;
wherein the device is configured to receive a transaction identifier associated with the UE shared key from the UE; to send the transaction identifier to the Direct Communication Element; to receive, from the Direct Communication Element, the direct communication key and the direct communication key encrypted with the UE delivery key; and to send the encrypted direct communication key to the UE;
wherein the Direct Communication Element is configured to receive the transaction identifier from the device; to obtain the session shared key from the BSF; to derive the UE delivery key; to generate the direct communication key; to encrypt the direct communication key with the UE delivery key; and to send the direct communication key and the encrypted direct communication key to the device;
wherein the interface comprises a Proximity Services (ProSe) interface; and
wherein the Direct Communication Element comprises at least one of a ProSe Function or a ProSe Key Management Server (KMS).

35. The system as claimed in claim 34, wherein the session shared key is derived further from a Direct Communication Element identifier.

36. The system as claimed in claim 34, wherein the Direct Communication Element is configured to derive the UE delivery key from at least the session shared key and a device identifier.

* * * * *